United States Patent [19]

Beck et al.

[11] Patent Number: 6,167,395
[45] Date of Patent: Dec. 26, 2000

[54] METHOD AND APPARATUS FOR CREATING SPECIALIZED MULTIMEDIA THREADS IN A MULTIMEDIA COMMUNICATION CENTER

[75] Inventors: Christopher Clemmett Macleod Beck, Oceanside; Jonathan Michael Berke; Joel A. Johnstone, both of San Diego; Robin Marie Mitchell, Cardiff; James Karl Powers, Carlsbad, all of Calif.; Mark Franklin Sidell, Chapel Hill, N.C.; Charles Dazler Knuff, Carlsbad, Calif.

[73] Assignee: Genesys Telecommunications Laboratories, Inc, San Francisco, Calif.

[21] Appl. No.: 09/183,390

[22] Filed: Oct. 29, 1998

Related U.S. Application Data

[63] Continuation-in-part of application No. 09/182,937, Oct. 29, 1998, Pat. No. 6,138,139, and a continuation-in-part of application No. 09/183,395, Oct. 29, 1998, and a continuation-in-part of application No. 09/183,551, Oct. 29, 1998, and a continuation-in-part of application No. 09/182,745, Oct. 28, 1998, and a continuation-in-part of application No. 09/151,429, Sep. 11, 1998, and a continuation-in-part of application No. 09/151,710, Sep. 11, 1998, and a continuation-in-part of application No. 09/151,564, Sep. 11, 1998, Pat. No. 6,108,711.

[51] Int. Cl.$^7$ .................................................. G06F 17/30
[52] U.S. Cl. .................................................. 707/3
[58] Field of Search ................................ 707/6, 3, 1

[56] References Cited

U.S. PATENT DOCUMENTS

| 5,857,184 | 1/1999 | Lynch | 707/4 |
| 5,893,912 | 4/1999 | Freund et al. | 707/103 |
| 6,021,428 | 2/2000 | Miloslavsky | 709/206 |

*Primary Examiner*—Kenneth R. Coulter
*Attorney, Agent, or Firm*—Donald R. Boys; Central Coast Patent Agency

[57] ABSTRACT

In a multimedia call center (MMCC) supporting multiple channels and forms of communication and storing call center transactions in a data repository, a threading software application has a programming input for a user to enter association criteria, an access function that accesses at least stored data in the data repository, a search function that searches accessed data for association criteria, and notes those data entities that meet the association criteria; and a display function that display at least indicators of data entities meeting the association criteria. The threading application serves as a research toll for mining data repositories of the call center for information pertinent to business goals of the enterprise hosting the call center. IN some embodiments the application is capable of associating transactions occurring real time as well as stored data.

14 Claims, 16 Drawing Sheets

Customer/Agent/Associate IMA Tool Kit

| Loan Application | 0000 | 00305 | 00255 | Update |
|---|---|---|---|---|
| Task | Name | Time Begin | Time End | Actual Time | Notify |
| 1 | Pre-Qual | 0000 | 0010 | 0008 | OK step 1a |
| 1a | Gen. Credit | 0001 | 0005 | 0004 | OK step 1b |
| 1b | Ent. Credit | 0004 | 00025 | 0002 | OK step 1c |
| 1c | Income Data | 0006 | 00025 | 0002 | OK step 2 |
| 2 | Loan Type | 0000 | 0008 | 0075 | OK step 2a |
| 2a | Select APP | 0001 | 0001 | 0001 | OK step 2b |
| 2b | Obtain data | 0008 | 0003 | 0003 | OK step 2b1 |
| 2b1 | Sorting | 0011 | 0003 | 00025 | OK step 2c |
| 2c | Insert Data | 00135 | 0001 | 0001 | OK step 3 |
| 3 | Post Qual | 00145 | 00115 | 00095 | OK step 3a |
| 3a | Val. Income | 0015 | 0004 | 00035 | OK step 3b |
| 3b | Val. Source | 00185 | 0003 | 0002 | OK step 3c |
| 3c | Income Opt | 00205 | 0003 | 00025 | OK step 3d |
| 3d | Calc. D/I | 0023 | 00025 | 0015 | Present |
| 4 | Agent Dis. | 0024 | 0002 | 00015 | END |

*Fig. 14*

METHOD AND APPARATUS FOR CREATING SPECIALIZED MULTIMEDIA THREADS IN A MULTIMEDIA COMMUNICATION CENTER

CROSS-REFERENCE TO RELATED DOCUMENTS

The present application is a continuation-in-part (CIP) of application No. 09/182,937, filed Oct. 29, 1998, now U.S. Pat. No. 6,138,139, application Ser. No. 09/183,395, filed Oct. 29, 1998, application Ser. No. 09/183,551, filed Oct. 29, 1998, application Ser. No. 09/182,745 filed Oct. 28, 1998, application Ser. No. 09/151,429, filed Sep. 11, 1998 application Ser. No. 09/151,710, filed Sep. 11, 1998 and application Ser. No. 09/151,564 filed Sep. 11, 1998, now U.S. Pat. No. 6,108,711, which are incorporated in their entirety by reference.

FIELD OF THE INVENTION

The present invention is in the field of telecommunication encompassing all existing sorts of interaction multimedia technology, and pertains more particularly to methods and apparatus for creating specialized multimedia-threaded dialogs within a multimedia communication-center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCPs), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, typically connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used as a key to access additional information from a customer information system (CIS) database at a server on the network that connects the agent workstations. In this manner information pertinent to a call may be provided to an agent, often as a screen pop on the agent's PC/VDU.

In recent years, advances in computer technology, telephony equipment, and infrastructure have provided many opportunities for improving telephone service in publicly-switched and private telephone intelligent networks. Similarly, development of a separate information and data network known as the Internet, together with advances in computer hardware and software have led to a new multimedia telephone system known in the art by several names. In this new systemology, telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach points in the network such as an Internet Service Provider (ISP). The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities. In addition to Internet protocol (IPNT) calls, a DNT center may also share other forms of media with customers accessing the system through their computers. E-mails, Video mails, fax, file share, file transfer, video calls, and so forth are some of the other forms of media which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In typical communication centers, DNT is accomplished by Internet connection and IPNT calls. For this reason, IPNT and the Internet will be used in examples to follow. IT should be understood, however, that this usage is exemplary, and not limiting.

In systems known to the inventors, incoming IPNT calls are processed and routed within an IPNT-capable communication center in much the same way as COST calls are routed in a CTI-enhanced call-center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR's), agent-connecting networks, and so on, with the capability of conforming to Internet protocol, call data arriving from either network may be integrated requiring less equipment and lines to facilitate processing, storage, and transfer of data.

With many new communication products supporting various media types available to businesses and customers, a communication center must add significant application software to accommodate the diversity. For example, e-mail programs have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

In addition to identifying and recording communication center interactions. It is desirable that threaded dialogs of such interactions be created and made available in a contact history for latter review. In systems known to the inventor, such dialog threading is practiced and includes a unique multimedia capability wherein threaded dialog may be cross-referenced to the actual media accounts. The inventor knows of no prior art network operating systems wherein multimedia threading is practiced.

The multimedia threading capability as practiced in a customer interaction network operating system (CINOS), as known to the inventor, supports conventional interaction (normal one on one primary dialog) and diverse interaction (related third party and multi-party dialogs comprising secondary dialog). These dialogs may be organized and placed on a customer or issue-specific thread, or an attatched hidden thread according to enterprise rules. Hence, any interaction related to a customer or specific transaction or issue may be logically stored and recorded.

Reviewing a contact history comprising such identified and organized dialog threads is vastly more efficient and meaningful than is the case with prior art systems that do not support multimedia or diverse dialog paths. However, since the dialog threads mentioned above are customer or issue specific meaning that only related dialogs and media are associated with the threads, it is still difficult to perform many other types of research that might be useful in a multimedia communication center. For example, it is desirable for an enterprise engaged in selling various computer components to track the customer satisfaction level related to the purchase and installation of one particular product such as a particular disk drive. It may be that the disk drive under scrutiny is introductory and success or failure of it's popularity will determine future production requirements.

It would be desirable under such circumstances to be able to create and review a specialized dialog thread containing all past and recent dialogs associated with the particular drive, even if the main theme of such dialogs is unrelated to the disk drive. Such capability exceeds dialog association methods taught with respect to systems known to the inventor and requires further innovation and invention.

What is clearly needed is a method and apparatus for creating specialized dialog threads about a specific pre-defined issue or issue set that will link a plurality of otherwise unrelated dialogs by utilizing previously stored data and current interaction dialog. Such a capability needs to extend to both stored transaction data and to real-time interactions. Such specialized threads or associations may aid in research to improve communication center efficiency.

SUMMARY OF THE INVENTION

In a preferred embodiment of the present invention, in a multimedia call center (MMCC) supporting multiple channels and forms of communication and storing call center transactions in a data repository, a threading software application is provided, comprising a programming input for a user to enter association criteria; an access function that accesses at least stored data in the data repository; a search function that searches accessed data for association criteria, and notes those data entities that meet the association criteria; and a display function that display at least indicators of data entities meeting the association criteria.

In a preferred embodiment the display function displays icons for data entities, the icons arranged in threads or tree structures. The icons may be interactive icons that, being selected, invoke and render the data associated with the icon. Further, the association criteria may comprise individual and combinations of key words, phrases, text strings, date of occurrence, time of occurrence, media type, participant characteristics, duration of interaction, and participant initiation.

In some embodiments the access function allows access to stored data and also an ability to monitor transactions occurring in real time. The real time transactions may comprise connection-oriented switched telephony (COST) calls, data network telephony (DNT) calls, including Internet Protocol (IP) calls, facsimiles, e-mails, voice mails, and WEB document interactions.

The application in embodiments of the invention may further comprise a programmable alert function that alerts one or more of persons associated with the MMCC according to programmed alert criteria.

In other aspects of the invention methods are taught for mining data in such a call center, and associating data according to a broad range of criteria, enabling researchers and auditors, and the like, to discover interesting and valuable facts about a host enterprise and business conducted that might not otherwise come to light. These and other aspects of the invention are taught in enabling detail below.

BRIEF DESCRIPTION OF THE DRAWING FIGURES

FIG. 14 is a Gant table illustrating a pre-defined business process as executed via an interface engine according to an embodiment of the present invention.

DESCRIPTION OF THE PREFERRED EMBODIMENTS

Figure 1:
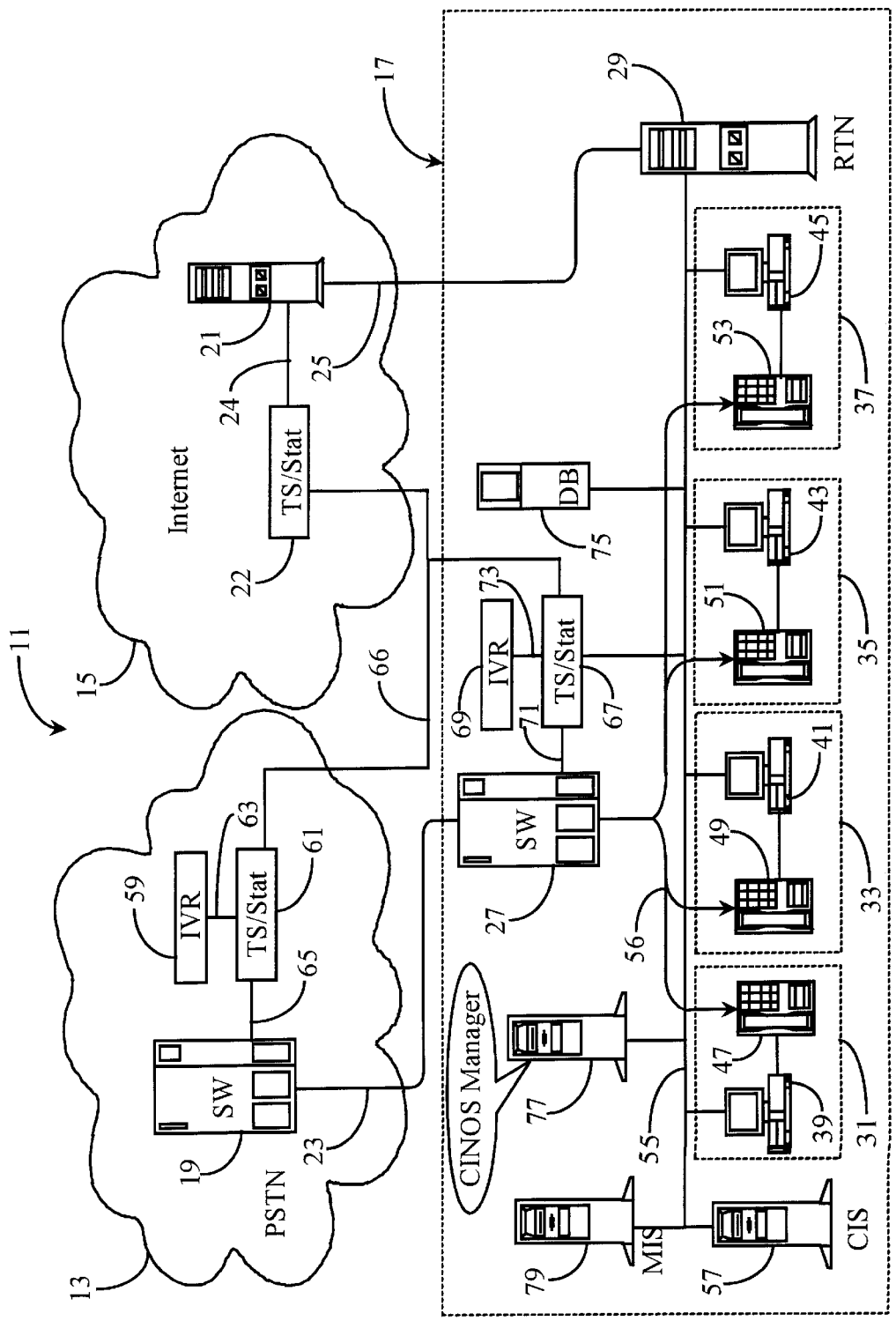
FIG. 1 is a diagram of a multimedia communications center enhanced with a network operating system according to an embodiment of the present invention.

FIG. 1 is a multimedia communications center enhanced with a network operating system according to an embodiment of the present invention. A telephony-network architecture 11 comprises an enterprise-hosted communication center 17 that is linked to, in this example, both a publicly-switched telephone network (PSTN) 13, and a wide area network (WAN) 15, which may be the public Internet or other digital network, such as a company Intranet.

In this particular embodiment communication center 17 handles both conventional telephone calls, which may be categorized as connection oriented switched telephony (COST) calls, and data network telephony (DNT) calls, which may be DNT calls over a private digital network or calls according to a protocol such as the well-known Internet protocol. DNT calls are characterized in that data is transmitted as addressed data packets as opposed to dedicated connections in COST calls. As indicated, PSTN 13 may be a private rather than a public network. WAN 15 may be a company Intranet, the Internet, or another type of WAN known in the art. The particular method of call delivery and call center integration is not particularly relevant for the purposes of this invention. There are many ways known both to the inventor as well as known in the art. Particular issues discussed in the disclosure between the telephones and the computers might be implemented differently depending on the actual system, but shall be deemed equivalent for all purposes of this invention.

Incoming COST calls arrive at a network-level telephony switching apparatus 19 in network cloud 13 and are connected over trunk 23 to a central telephony switching apparatus 27 within communication center 17. From switching apparatus 27, calls are routed according to existing routing rules over internal wiring 56 to agents' telephones 47, 49, 51, and 53 residing at agents' workstations 31, 33, 35, and 37 respectively.

Incoming DNT calls, and other communication events such as e-mail, file transfers and the like, arrive at a routing node 21 in WAN 15 and are passed on over digital connection 25 to a routing server 29 within communication center 17. Once calls arrive at server 29, they may, in some embodiments, be routed directly over LAN 55 according to existing routing rules to personal computer/video display units (PC/VDU) such as PC/VDU 39, 41, 43, or 45 located at agent's workstations 31, 33, 35, and 37 respectively.

In this embodiment, switch-connected telephones 47–53 are also connected to PC/VDU's 39–45 via a headset to computer sound-card according to technique known to the inventor and accomplished via an I/O cable. Thus connected, agents may respond to incoming COST and DNT calls with the same headset.

In the exemplary system and communication center shown, the equipment and applications are adapted to provide for multimedia operation at each of the agent stations, so the agents can interact with clients in many different ways, as are known in the multimedia arts.

Computer telephony integration (CTI) enhancement is, in this embodiment, provided both at communication center 17 and in PSTN 13. For example, in PSTN 13, a processor 61 running instances of a CTI application known as a T-server (TS) to the inventors, and a statistics server (Stat) is connected to telephony switch 19 via CTI link 65. An intelligent peripheral 59 of the form of an interactive voice response unit (IVR) is connected to processor 61 via data connection 63. Similar CTI equipment is illustrated within communication center 17. Namely, a processor 67 running instances of TS and Stat and connected to telephony switch 27 via CTI link 71, and an IVR 69 connected to processor 67 via a data connection 73, with processor 67 further connected to a local area network (LAN) 55 within communication center 17.

In alternative embodiments there may also be a CTI processor 22 in WAN 15 connected to server 21 by a CTI link 24. Also in some embodiments a separate data network 66 connects these CTI processors. In this way, intelligent routing may be performed at the network level with negotiation and direction from within communication center 17.

It will be appreciated by those with skill in the art that the CTI enhancements, as immediately described above, may be hosted on one processor at PSTN 13 and on one processor at communication center 17 without departing from the spirit and scope of the present invention. The inventor has chosen to show separate processors having separate functions for exemplary purposes only. It will also be appreciated by the skilled artisan that there may be many more or fewer than the four agent stations shown in communications center 17, and hardware and software arrangements may be made is a variety of ways. Also, home agents might be connected in a variety of ways to the call center.

In a preferred embodiment of the present invention, a customer-interaction network operating system, hereinafter termed (CINOS), is provided for the purpose of managing communications center 17, and optimizing and recording all agent/customer interactions received at communication center 17 from networks 13 and 15. CINOS is unique in the fact that it is a multi-tiered object-and process-orientated system wherein logic regarding the various aspects of it's functionality is achieved via knowledge-based architecture and object modeling. Various functions of CINOS, more fully described below, include capturing (recording), analyzing, routing, and, in many instances, responding via automated process to customers engaged in interactions with the enterprise (company hosting the communication center). CINOS is adapted to support all planned communication mediums such as multimedia DNT applications including e-mail, video mail, file transfers, chat sessions, IP calls, and CTI COST transactions such as voice calls, voice mails, faxes, and so on.

Referring back to FIG. 1, CINOS utilizes various LAN-connected machines in order to perform various operations. Among these various hardware implementations are a multimedia server (MIS) 79 adapted to physically store and serve all multimedia transactions, and a customer-information-system server (CIS) 57 adapted to physically store and serve information relevant to customers such as purchase history, financial status, product preferences, contact information, etc. A central server (COS) 77 acts as a host location for a CINOS manager application (noted in text balloon) which is, in effect, the parent application that controls all of the operation and functionality of the system.

In addition to the above-mentioned machines hosting CINOS routines, each PC/VDU such as PC/VDU 39, for example, has a CINOS-agent desktop interface or client application (not shown) adapted to interact with the parent application. Also, each machine that provides particular dedicated function to communication center 17 such as switch-connected CTI processors, IVR's, and other related equipment host instances of CINOS application-program interfaces (API's) to enable seamless integration of differing parameters and/or protocols that are used with various planned application and media types utilized within communication center 17. Such programs may also co-reside or be in any combination or hosted by themselves. Additionally, for performance purposes, additional dedicated network links may exist between those servers, but essentially they are only performance boosters, and hence for clarity purposes, only a simple network is shown.

As previously described, CINOS comprises a multi-tiered architecture. This unique architecture comprises an external media layer for interfacing with the customer or business contact, a workflow layer for making routing decisions, organizing automated responses, recording transactions, and so on, and an internal media later for interfacing and presenting interactions to an agent or knowledge worker. An innovative concept associated with CINOS involves the use of tooled process models, knowledge bases, and other object models as base instruction for it's various functions. These modular conventions may be inter-bound with each other, and are easily editable providing a customizable framework that may conform to virtually any existing business logic.

In simple operation, and after any network level routing, COST calls and DNT calls including other media events arrive at communication center 17 to telephony switch 27, and routing server 29 respectively. Network level routing, as defined herein, includes any intelligent implementation that may be in place and aided via processors 59, 61, and 22. Load balancing to multiple communication centers, and transferring customer data obtained at network-level over data-network connection 66 would be examples of such network-level routing.

Once a call or other communication event registers at either switch 27 or routing server 29, CINOS immediately identifies the media type associated with the call and begins it's processes depending on enterprise rules. For example, a live COST call may first be routed to IVR 69 whereby the customer can be presented with varying choices such as leaving a voice message, waiting in queue, receiving a call back, or perhaps an e-mail, and so on. Interaction by IVR 69, in this instance, will preferably be via voice recognition technique such as is known in the art, but may also be via touch tone response or other known method. As previously described, the caller may elect from a number of options, such as to hold for a next available agent, select an automated response such as a fax back, or perhaps a later agent-initiated response such as an e-mail or call back. In all cases, CINOS seamlessly processes and executes the logic required to accomplish the goal of the caller in a media and application-independent fashion.

DNT events are handled much the same way as described above for live callers. For example, an IP call may be routed to a digital equivalent of an IVR for interaction or queued for a next available agent, and so on. In one embodiment, IVR 69 may be adapted to handle both COST and DNT interaction.

All interactions with live external media, including actual text-based events whether live or not, are recorded and stored in MIS 79 with an associated text version of the media stored as well, and becoming part of an overall threaded contact history. This is accomplished in varying ways according to existing parameters such as media type, whether the event is a live call, and so on. For example, CINOS may execute a command directing IVR 69 to digitally record an incoming COST call during customer interaction and then store the voice recording of the transaction in MIS 79. A text version of the recording either created simultaneously from the voice recording via voice-to-text techniques (known in the art), or created by a live attendant via manual annotation may be sent to and stored in DB 79. An IPNT call arriving at routing server 29 may be similarly recorded and stored in MIS 79 with an associated text version of the interaction stored in DB 79. E-mails, video calls, voice mails and so on are similarly handled. For example, an incoming e-mail is stored in MIS server 79 while text from the e-mail may be extracted and stored associated with the e-mail.

The purpose of the text version of the event is twofold. Firstly, a complete text-based transaction history of communication center 17 may be compiled and reserved for later access and audit. Secondly, an agent or knowledge worker may, in some instances, see the text version of the event at the same time that he receives routed notification of the event. In this way, an agent may begin mental preparation before taking a call. The text version of an event must be machine-readable and human readable at times displayed. Interactive media-independent viewers, part of the agent's client application, may be used to disseminate information which may initially not be human readable.

It is important to note here that the text-based version of an event may or may not be a complete and verbatim rendition of an actual media event. For example, an e-mail may contain many documents each having many pages of text. Therefore, the text-based version of a particular e-mail event may simply contain the name and particulars regarding the author, a purchase order, and a list of the enclosed documents by title, and basic content or memo as well as a possible manual annotation. The attachments to the e-mail may be stored separately, and be also cross-indexed and retrievable. Seeing the purchase order when the event is routed to an agent desktop tells the agent that this e-mail is important.

A fax, stored originally as a bit-mapped document, may be converted to text in the system via optical recognition (OCR) technique wherein sometimes only certain content such as the authors contact information, basic intent of the fax, and perhaps special numbers or codes contained in the original fax are recorded in a text version 79, sometimes the whole text is OCR'd, while the original fax is stored in it's entirety in DB 79. Such codes or numbers that are specifically parsed from actual media may be part of a unique coding system set up by the enterprise whereby customers are directed to include such codes or numbers with their orders, service requests, and so on.

Parsing text messages is accomplished via a text-analyzer known to the inventor. In other non-text media types, such as video or graphics, descriptive notes may be taken via live attendant and stored in DB 79 as previously mentioned. Voice recognition technology may also be used in a case of recorded sound or video with sound. All transactions regardless of media type are thus recorded and stored according to enterprise rules with at least a meaningful part of the content if not all of the content of such transactions converted to text and stored in DB 79 associated with the recording of the event. Again, the importance of the text version is that the extracted knowledge of the transaction therein is in machine-operable code, allowing search and cross-referencing functions that may otherwise not be possible.

After incoming events are analyzed and processed with regards to queuing, recording, storing, etc. CINOS decides the disposition paths of each event. For example, live calls in queue are routed to live agents if available, if this is the priority action in the enterprise rules. E-mails are either routed to next available agents using a push technology, or simply stored in MIS server 79 where they may be retrieved by agents after receiving notification. Recorded events such as IVR voice requests are stored in MIS server 79 where they may be retrieved by agents, and so on.

By the use of routing and routing notification events, any media may be routed to an appropriate agent based on skill, or any other rule-based routing method over LAN 55. Actual multimedia events may be accessed from MIS server 79 at the agent's discretion, or by rule, and text-based versions of those events stored in DB 79 may be mirrored and routed to the agent along with notification of the incoming event.

Other services may be performed by CINOS such as responding to media requests without agent participation via initiating automated fax responses, out-bound dialing campaigns wherein recorded information is given to a customer perhaps concerning an order placed by the customer, and so on. Networking via business or chat applications between several business partners, customers, agents, and so on, is possible wherein each entry may be stored in DB 79 as part of a discussion thread including responses of another media type, perhaps initiated by a communication-center agent to one of the participants during the discussion.

As a general rule, full multimedia storage is done in a mass storage server, and linked by cross-indexing to the database. Depending on the business model, full text or only partial annotation is stored in the database, or a mix therof, e.g by media type.

In addition to supporting a wide variety of applications and protocol, CINOS is provided with the tools for building media-independent self-help wizards that are adapted for problem solving and reduction. Similarly, external and internal interaction media viewers are provided and adapted to support any media of choice.

CINOS uses object modeling and linking techniques that are known in the art to effect much of it's goal of presenting a seamless customer interaction with an enterprise agent or knowledge worker operating in a communication center such as center 17. For example, an interaction object model (IOM) represents a transcript of all interaction history stored in DB 79 and provides an audit trail of the state of transactions of all interactions. An interaction process model (IPM) controls how events are handled within the operating system.

An additional set of models handle how agents receive their routed media such as via traditional push model, blended push model, publish and subscribe model, or interrupt model. Prioritizing interaction events may also be accomplished through varying the push theme or scheme. For example, traditional push technology for e-mail means that only e-mail (media type) is being worked on by an agent. By blending the push model with a publish and subscribe model, the interrupt model is created wherein the agent may subscribe to various routed media such as answering phones, and responding to faxes, but may be interrupted for an important interaction of another media type such as e-mail and so on. In this way an agent's time may be utilized according to enterprise rules within an automated environment.

Outbound campaigns may be configured according to enterprise rules and media preference using a single rule-set knowledge-base. This single set of outbound tools can be used to initiate customer dialog via predictive dialing, e-mail push, automated recorded messages, and so on.

It will be apparent to those with skill in the art that common object modeling (COM) can be used to create virtually any type of model for any type of enterprise situation. It is the intention of the inventor to provide the applicable control codes known in the art for building process and object models and enabling the linking and interaction between the models. As previously described, it is partly the fact that CINOS uses these various models and knowledge bases to achieve desired interaction that sets it above current-art systems. The inventor knows of no such network interfacing operating system that is based on the above described technology.

CINOS may be implemented in a number of different topologies. For example, CINOS may be implemented as a centralized topology with one communication center as shown here in FIG. 1, a distributed topology wherein a single communication center may span multiple physical locations, a segmented communication center wherein a single pool of agents services more than one company or customer base, or a wide communication network wherein a plurality of communication centers such as center 17 cooperatively service a common pool of customers or a customer base. Enterprises involved in commerce such as large financial institutions hosting many geographically separate communication centers may build their entire networking system using CINOS architecture in standardized and distributed fashion. There is no limitation to the type of enterprise that may use CINOS as it may be tooled to accommodate virtually any network architecture linked to a communication center having DNT capability.

It will also be apparent to one with skill in the art that CINOS routines according to various embodiments of the present invention may be included and implemented at the network level without departing from the spirit and scope of the present invention such as in processor 61, and IVR 59 in PSTN 13, or in routing node 21 in WAN 11.

Figure 2:
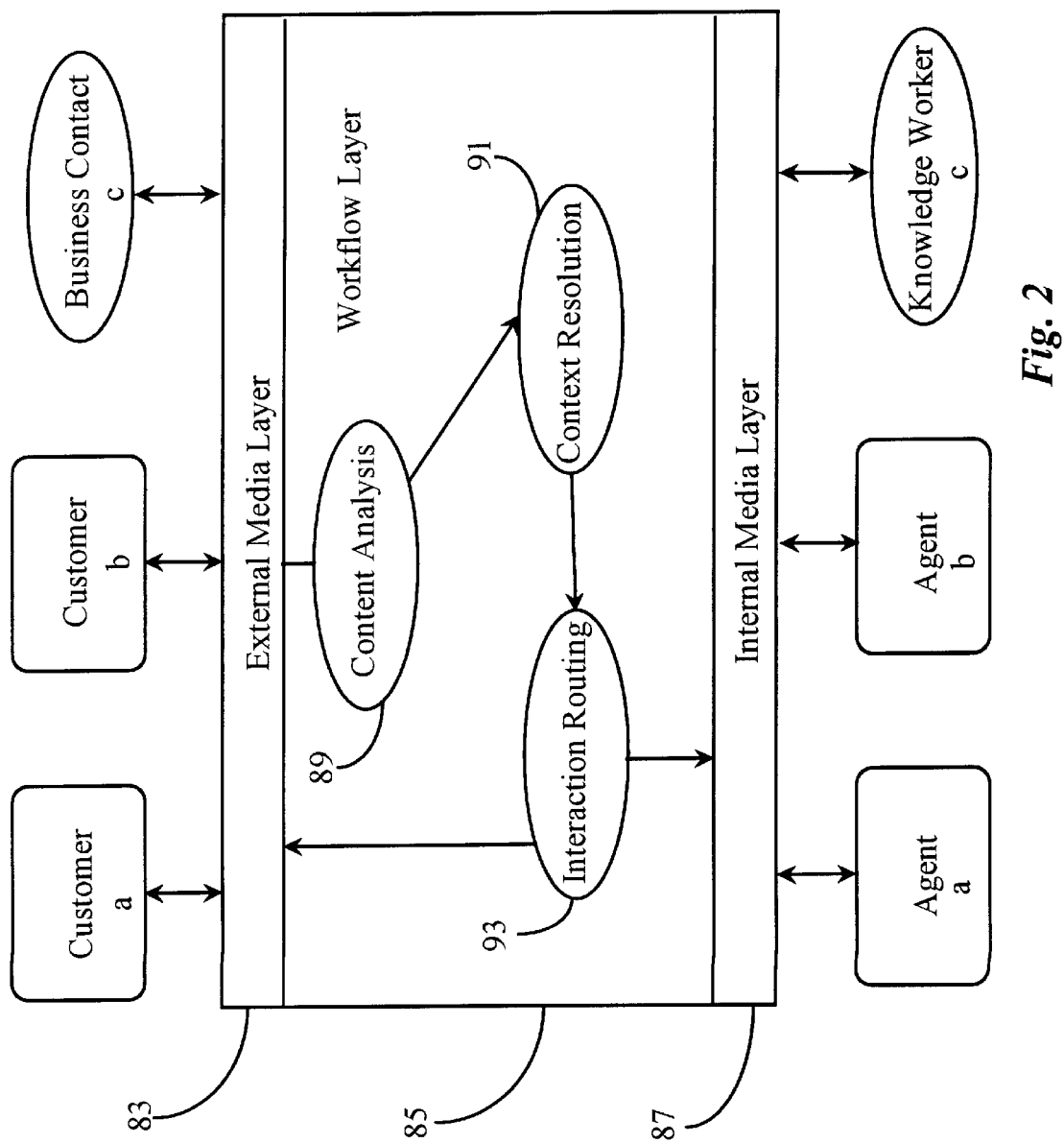
FIG. 2 is a block diagram illustrating basic layers of a customer interaction operating system according to an embodiment of the present invention.

FIG. 2 is a block diagram illustrating basic layers of the network operating system according to an embodiment of the present invention. As previously described with reference to FIG. 1, CINOS comprises three basic operating layers. They are an external media layer 83, a workflow layer 85, and an internal media layer 87. External media layer 83 interfaces directly with the customers or business contacts or partners as illustrated via customers a and b, and business contact c. The bi-directional arrows beneath each of the above mentioned participants illustrate interactive participation with CINOS on the customer side.

External media layer 83 may, in one embodiment, be a multifaceted, web-based self-help interface providing news information and a host of other services that may be personalized by the customer. In many respects, external media layer 83 in this embodiment is similar to a web browser.

Workflow layer 85 comprises 3 basic function categories beginning with a content analysis category 89 wherein textual analysis, voice analysis, IVR interaction, recording and storing takes place. A next category is context resolution 91. Context resolution involves customer identification, business process binding, preparation for routing, and so on. A third category termed interaction routing 93 comprises various processes associated with the presentation of the interaction to agents, service persons, knowledge workers, business partners, customers and the like, that is, all transaction partners. Category 93 covers queuing, skill-based routing, automated treatment, workflow models, and so on.

Internal media layer 87 comprises an agent desktop interface not shown in FIG. 1, but described in more detail below. Both external layer 83 and internal layer 87 contain the required tools for enabling media and application-independent interfacing such as previously mentioned self-help wizards, media viewers, and other controls as prescribed via enterprise rules.

Internal media layer 87 provides an agent with, among other options, information about the customer or contact, information about current or historical business processes, information about current interactions and their relationship to business processes, and a knowledge-base to guide the agent or knowledge worker with interaction response and workflow. An agent a, and agent b, and a knowledge worker c are shown herein interacting with the system as illustrated via bi-directional arrows. The skilled artisan will recognize these are merely examples, and there may be many more such persons, and interactions in some instances may be routed to machines for response.

It will be apparent to one with skill in the art that the multi-tiered architecture of CINOS such as is illustrated herein may comprise many more or differing steps or processes without departing from the spirit and scope of the present invention.

Figure 3:
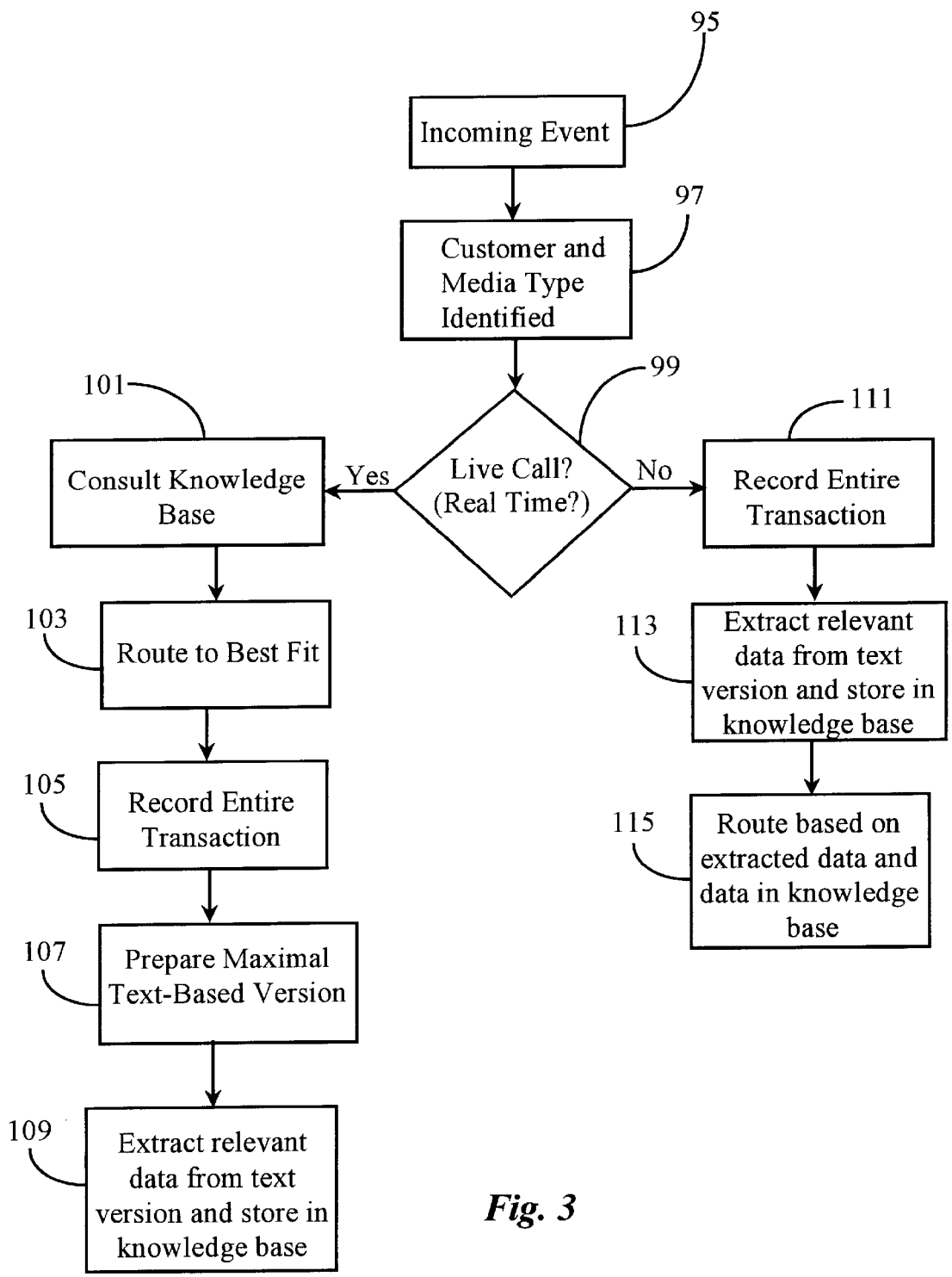
FIG. 3 is a flow chart illustrating basic steps performed by the network operating system of FIG. 2 related to completing interactive transactions between business partners.

FIG. 3 is a flow chart illustrating basic steps performed by the interaction operating system of FIG. 2 related to completing a transaction between a customer and an agent, wherein the transaction is initiated by the customer. Similar steps may be accomplished in the opposite direction for communications initiated by an agent, as the system is bi-directional, but the present example will serve to teach the inventive aspects of the system. In step 95, an incoming transaction, such as a live call, an e-mail, etc., is received at the appropriate CTI switch (COST) or routing server (DNT) in a CINOS communication center such as center 17. In step 97, customer and media type are identified and interaction proceeds.

All transactions, whether live calls, such as video calls, DNT calls and COST calls, or text-based documents, such as e-mails, are recorded and stored in one or more mass storage devices handled by one or more database applications. This may be taken as server 79 of FIG. 1, although the diagram of FIG. 1 is exemplary.

A principle object of the invention is to extract maximum information from every transaction for building a knowledge base that can be used for dynamic management and future analysis and development. This is done primarily by data mining, which is applicable to machine-operable code, that is text. Because of the nature of the extraction, there is a difference in the way live calls and text-based media is handled.

Discrimination as to the text nature of the media is made at step 99. If the media chosen by the customer is already text-based, then the transaction is recorded as received (101), and a data mining application extracts important information in step 103 and stores it in the knowledge base.

The distinct portions and versions of the transaction, such as the originally recorded version and any extracted data are related to one another and to other knowledge previously stored, and become part of a threaded interaction history associated with an ongoing interaction and ultimately of an overall contact history.

If the media chosen by the customer is determined in step 99 to be a live interaction such as a COST or IPNT call, then the existing knowledge base is accessed at step 107, and the call is routed to the best fit agent. This may, of course, be done in a number of ways, such as an ADC, skill-based routing as known to the inventors, transfer to an IVR for automatic processing, and so on, as may be dictated by enterprise rules. If routing is to an agent, customer information may be retrieved from CIS server 57 (FIG. 1) and sent to the agent's PC, and appropriate scripts may be provided to guide an agent in interacting with the caller.

In step 109 the actual transaction is recorded as it takes place, which, in the case of live calls, may be a video or an audio recording or a combination of both. Preferably the recording is digitized.

In step 111, a maximal text version is prepared from the actual transaction. The ability to do so depends to a degree on the sophistication of the system. This process may be as simple as a person adding notes for annotation or as sophisticated as a voice-to-text application preparing a full text version as the transaction transpires.

In step 113 the text version is mined for data and resulting knowledge is stored in the appropriate knowledge base for future use, and added to overall record with appropriate cross-referencing.

It will be apparent to one with skill in the art that there will be many routines comprising various steps for performing different processes as may be determined by enterprise rules which may likewise vary depending on, among other considerations, company type, product and or service type, communication center architecture, whether or not the system architecture is centralized or distributed, and so on. The embodiment taught herein is meant only as a basic example of process functionality related to CINOS processing of an incoming event.

Figure 4:
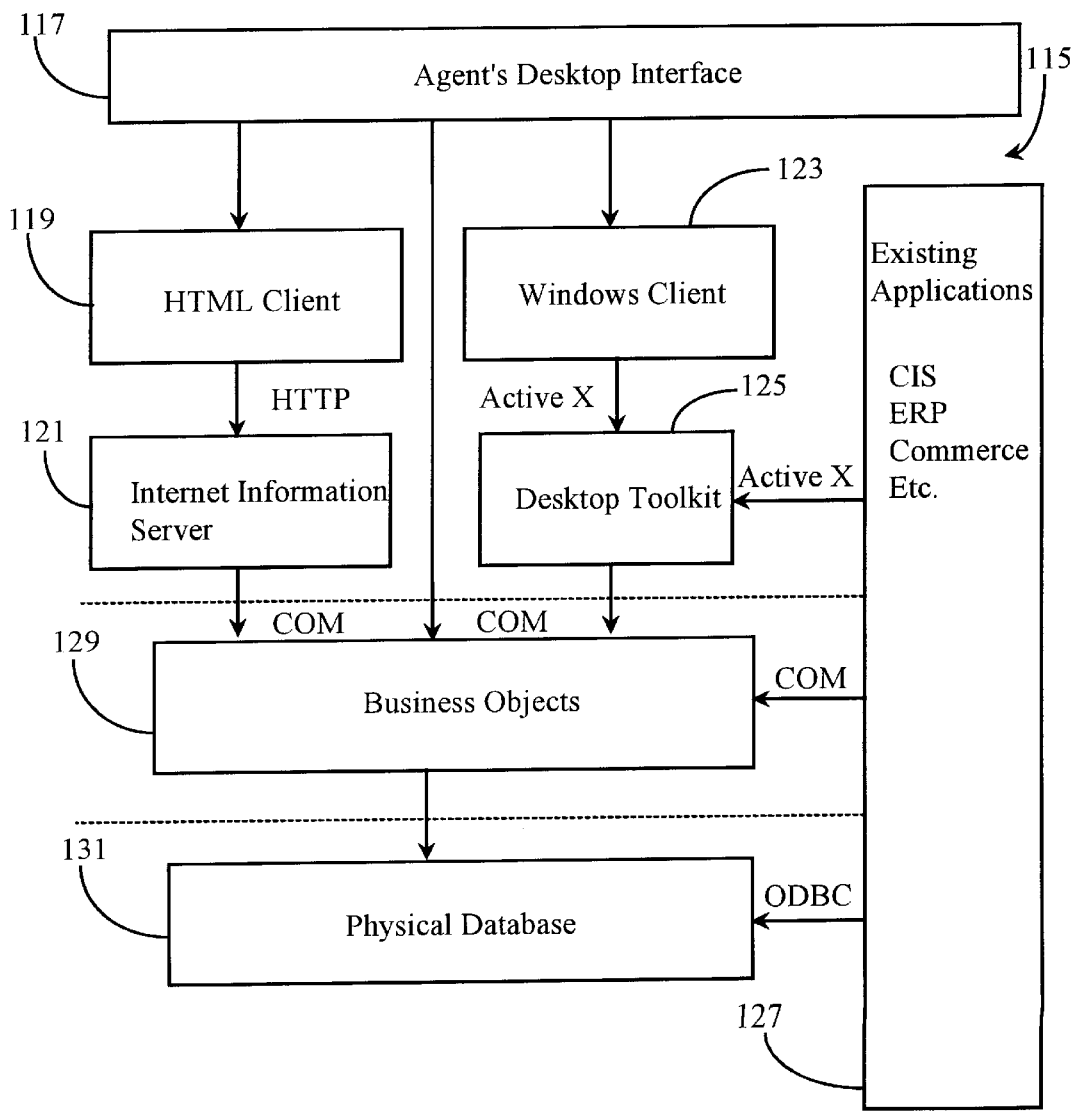
FIG. 4 is a block diagram illustrating agent-desktop function according to an embodiment of the present invention.

FIG. 4 is a block diagram illustrating agent-desktop function according to an embodiment of the present invention. An agent-desktop client 115, part of the CINOS overall architecture, enables an agent or knowledge worker to configure and control his or her interface to the rest of the system and to external media. Client 115 may be personalized according to a particular agents parameters. A desktop interface 117 may appear and function much like a personalized web-browser containing many similar attributes related to network capabilities including full multimedia function, software tool kits, linking and embedding capability, and so on.

An HTML client application 119 oversees all of the network capability previously mentioned. In this embodiment for example, HTML client 119 communicates with an Internet information server 121 using HTTP protocol which is standard. Client 119, if provided minimally, may be used in conjunction with an Internet browser for full multimedia function. In some embodiments, it may be maximally provided to be a fully featured client with full web browser function. For example, an agent may create and edit web forms, web pages, embed controls into such web-based forms or pages to provide certain customer interaction mechanisms in addition to having a fully functional navigation tool at his disposal.

In another embodiment, Server 121 may be a server on a private network or corporate WAN instead of an Internet server. In a preferred embodiment, however, any number of servers on the Internet and/or linked to a WAN other than the Internet may communicate with client 119 as it intended to support all existing and known communication protocols.

A windows client 123 is provided to seamlessly integrate existing applications on the agent's PC to network applications and processes. This may be implemented via a desktop tool-kit 125 that contains all of the required controls for building, integrating and customizing the interface.

A business-logic layer comprises business object models 129, hereinafter termed business objects 129, representing contacts, interactions, knowledge-bases, events, routing processes, and other system routines. Integration and interaction of the various described desktop components with these logics is accomplished via common object modeling (COM) which is known in the art and available to the inventor. Desktop to CTI integration is accomplished via controls provided or created with a CTI set of tools or tool kit (not shown). For example, if the enterprise desires to blend voice and e-mail, the CTI tool kit would be used to build and integrate the interface.

Existing network applications such as CIS, enterprise resource planning (ERP), Commerce, and the like interact with various business objects using COM and may also interact with a physical database using ODBC and SQL.

Customer Interface Media Window

According to a preferred embodiment of the present invention, CINOS access by customers of an enhanced multimedia communication center, such as center 17 of FIG. 1, is controlled by means of a customer-facing media interface, by which customers may be identified and even categorized according to numerous criteria. In some cases access may be controlled through subscription, or according to other qualifying criteria such as may be deemed appropriate by the enterprise. For example, if the enterprise is an exclusive investment club, membership may be required. Categorizing criteria may include demographic information such as income level, credit history, or any other attribute that may be quantified and used to categorize a customer.

An enterprise-controlled access point may be defined as an interfacing window or portal created and maintained at a typical customer entry point in a network as may be known in the art. Such interfaces may take the form of a WEB-based customer interface (a WEB page), an interactive voice response (IVR) unit, a service control point (SCP), or some other customer-facing system or apparatus as may be known in the art.

For the purposes of this specification, an example of an enterprise-controlled WEB-form access and interface window is illustrated as an example for a preferred embodiment. The inventor deems such an interface to be most adept in offering best-fit media options while remaining accessible to a large customer or client base.

Figure 5:
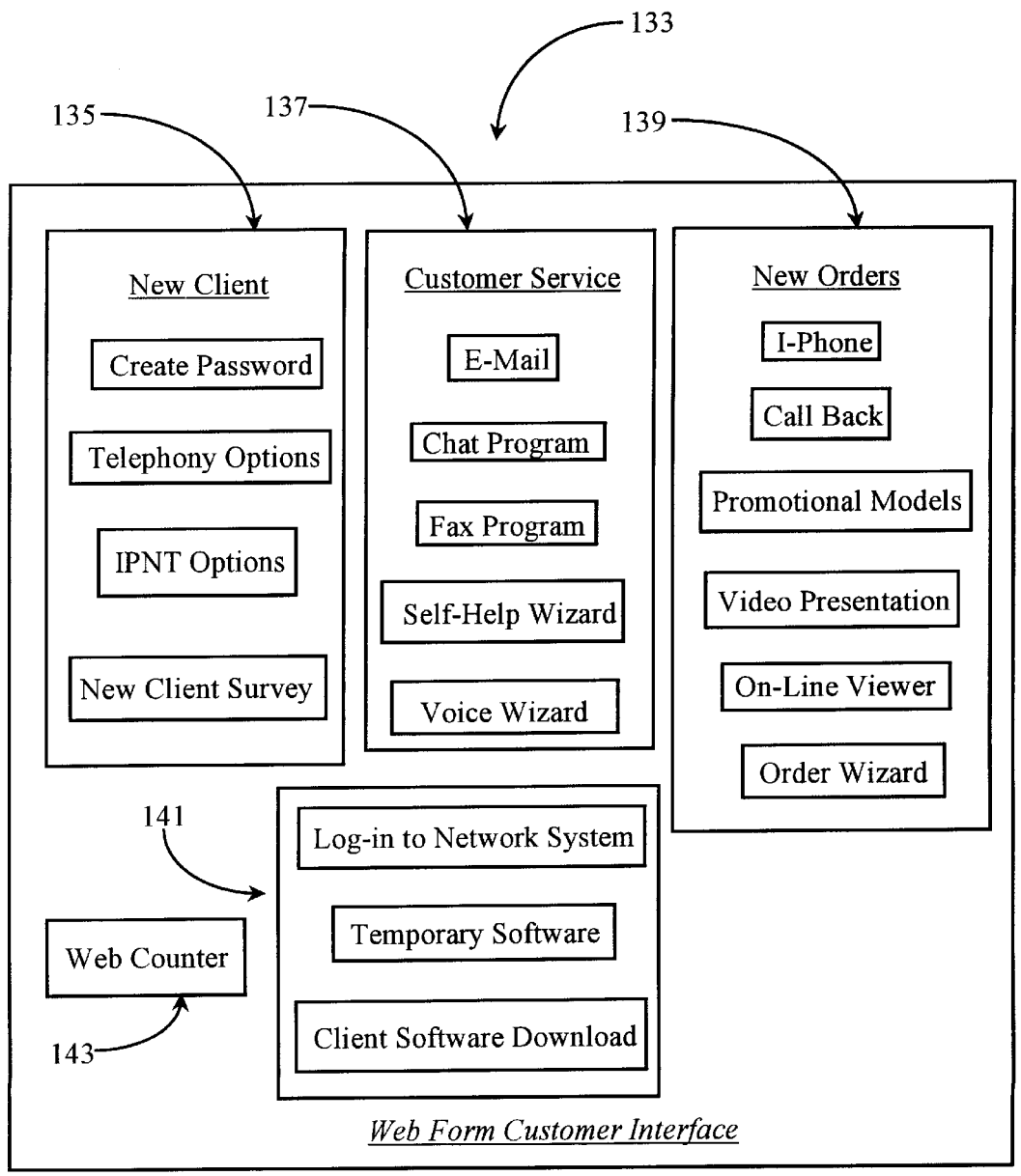
FIG. 5 is a block diagram of an exemplary WEB-form customer interface according to an embodiment of the present invention.

FIG. 5 is a block diagram of a WEB-form customer interface according to an embodiment of the present invention. WEB form 133, hereinafter termed access window 133, is provided to be a part of an enterprise's WEB page which may be accessed through Internet connection and navigation, as is known in the art. Widow 133 is part of the CINOS software architecture described above, and represents the initiation of any customer interaction with the hosting enterprise. A WEB counter 143 is provided and records the number of visits to window 133.

Window 133 is built and edited using COM codes available to the inventor and typically found in tool kits adapted for the purpose of creating interactive displays on a WEB page. Such a tool kit may be located on an agent's desktop, perhaps part of an agent's HTML client such as client 119 of FIG. 4. In one embodiment, it may be part of a system administrator's tool kit.

Window 133 contains interactive options directed at various categories and functions. For example, a new client section 135 contains interactive options related to adding a new client to the active customer base of the enterprise. A customer service section 137 contains interactive options presented to existing clients needing service. A new order section 139 contains interactive options presented to existing clients wishing to do new business.

Each offered interactive option is an embedded executable function having the appropriate links to other system areas of CINOS such as may be relevant to the immediate interaction such as to services offered, routing routines, database searching, interaction recording, and so on.

An innovative function of window 133 is to provide front-end control of access to the enterprise by existing and potential clients/customers. For example, as a client, contact, or potential client interacts with the various media and functional options presented by the enterprise in window 133, he or she is being directed according to enterprise rules in such a way that he or she may first be qualified or not to patronize the enterprise. Secondly, the contacting person may be categorized and sorted as to type of qualified customer. Thirdly, the person contacting person may be directed to pre-selected media options by the enterprise for various services offered including but not limited to routing live interactions, and so on.

In a preferred embodiment of the present invention, access window 133 is fully customizable, based on customer data and enterprise rules with the focus of such customization directed toward benefiting the enterprise and ultimately the client. That is, the client's options within window 133 are pre-selected and preferred by the hosting enterprise based in part on data about the client, details about the client's communication equipment and software, and enterprise rules and constraints. In some embodiments, the client may aid in customizing window 133. However, as it is desired by the enterprise to provide service in a cost-effective manner, the client will be presented with options as preferred by the enterprise in most cases.

To further illustrate, refer now to new client section 135. If window 133 is part of the enterprise WEB page, as is the case with this example, there will be a variety of visitors which may or may not be pre-qualified by the enterprise. Therefore, an interested party would begin (and be restricted to) taking a new client survey, illustrated as one of the options in section 135. If the enterprise rules require this as a first step, then the other options may be enabled only upon completion of the survey. By choosing new client survey, a second window may contain various survey options such as via e-mail, interactive voice recording, type and send method, or the like.

Information taken in the client survey is recorded and entered into a CINOS database such as DB 75 of FIG. 1. Such information may also be compared against enterprise rules or constraints, and other known information as may be available to the enterprise. Assuming the client is now recognized by the enterprise, the client's media hardware and telephony information may be recorded for future interaction purposes. Such information may include the client's personal computer parameters including modem type, Internet connection type, computer platform type, type of Internet phone application installed, etc. Similarly, COST telephone parameters may be recorded, such as personal phone number, business phone number, cellular phone number, forwarding numbers, and so on. Such data will influence latter customization of his personal window 133 for the particular client including the types of media that will be offered.

Finally, the client may be asked to create a password for the purpose of accessing CINOS. A section 141 is provided containing a network log-in option along with download sections for obtaining permanent and or temporary software as may be desired or needed, or, in some cases, required for the client to access certain services, view certain content, and so on.

Section 137 presents media options for clients seeking customer service from the enterprise. These options are, in a preferred embodiment, presented in a customized or personalized fashion within the client's window 133 as was described above. Therefore, each client patronizing the enterprise may access a version of window 133 that differs in look and functionality than that of another client. In this example, service section 137 contains options for e-mail, chat program, fax program, a self-help wizard, and a voice wizard. Other media types may be added or subtracted from the client's window 133 depending on any of several criteria. Personalization of widow 133 takes into account client information as stored in CINOS database 75, service-agent media availability and preferences, and perhaps any overriding enterprise rules. Unless and until a client is identified there are typically no options presented to the client for continuing a transaction with the enterprise.

For an identified client, by selecting the e-mail option, the client's preferred e-mail program may be activated for the purpose of sending a message to or soliciting a reply from a service agent. By selecting chat program, the client may be launched into a scheduled service seminar featuring many clients interacting with a service expert regarding a certain subject. One enterprise rule regarding section 137 may be that there is no telephone or I-phone media option for customer service for a client in the absence of an ongoing project with the particular customer. In this sense an ongoing project includes any unfinished business that the client is involved in with the enterprise.

Self-help wizards and voice wizards as illustrated in section 137 may be offered to help a client resolve an issue without taxing further resource. Such wizards may be customized based on a client's recorded data, perhaps confirming past interactions, providing account or order status, and so on. In some embodiments, selecting an option might avail several additional options. For example, selecting chat program may avail three possible chat programs to choose from with different schedules, content, and functionality attributed to each individual program.

New order section 139 in this example contains various options adapted to facilitate placing orders. The options as illustrated herein include, but are not limited to, I-phone, call back, promotional models, video presentations, an on-line viewer, and an order wizard. Interaction is the same as was stated with regards to section 137. For example, selecting promotional models, accesses a database containing the current promotional information and features of products which may be viewed interactively by the client using an on-line viewer offered as one of the functional options (tool). The options presented in the New Orders section may also be customized according to client identity, demographics, transaction history, and enterprise rules.

On-line viewers may enable the client to view documents that are not supported on his computer platform. Selecting video presentation may avail several types of videos for viewing, such that the client may choose one. If the client does not have a viewer installed on his computer which will support the offered video, perhaps the on-line viewer may play the video, or the client could download a temporary viewer from section 141, etc. Selecting call back may bring up a second array of media choices made available by the enterprise for receiving a reply interaction from an agent.

By providing a controlled interface window such as window 133 the enterprise may control routing and interaction right from the beginning of customer contact. Through the innovative method of linking and reporting to other CINOS functions, and repositories, much real-time personaliation of window 133 according to enterprise rules and customer parameters may be made automatically. For example, if a client's history indicates a propensity toward frequent buying, an I-phone option may be presented in customer service section 137 in his window 133 immediately after such a determination so that he may get direct customer service at all times.

Certain media options, as described above, may be afforded a certain priority over one another regarding interaction with the enterprise. For example, a VIP client may have live interactive media choices offered in window 133 such as I-phone, call back to COST phone, video phone, etc. A client known for infrequent contact or troublesome interactive history may be limited to text-based interaction such as e-mail and so on.

As an integral part of CINOS functionality, window 133 acts as a portal through which existing and potential clients may be screened, categorized and routed according to enterprise rules. Customer interfaces such as window 133 may be provided at various locations on a WAN such as the Internet without departing from the spirit and scope of the present invention. Such portals may exist in different geographic regions, and may be created for differing customer bases such as one for Latin America, and one for the pacific rim, and so on. Instances of CINOS routine may be distributed widely over a network.

Although the example provided herein is of a WEB form, it will be apparent to one with skill in the art that a CTI counterpart may be created for the COST telephony network. Such a case may be a CINOS enhanced IVR at an SCP or customer access point in the COST network.

CINOS, as previously described, optimizes customer/agent interaction in a manner which is economical and cost efficient to both the enterprise and the patronizing client. The customer interfacing window as taught herein with regards to FIG. 5 is innovative in that it is a fully customizable portal that facilities seamless integration between clients and enterprise agents according to enterprise rules. Further innovation is evident in that client data is fully and seamlessly integrated with CINOS intelligence and enterprise rules regarding routing of interactions and other constraints or limitations that are programmed into the system. In effect, logic from the front end, or customer side, to the back end or agent side is linked and accessible to all appropriate CINOS routines which include applicable CTI CINOS routines. The various customer interfacing logic is are explained more fully below in a series of process logic steps in a flow chart.

Figure 6:
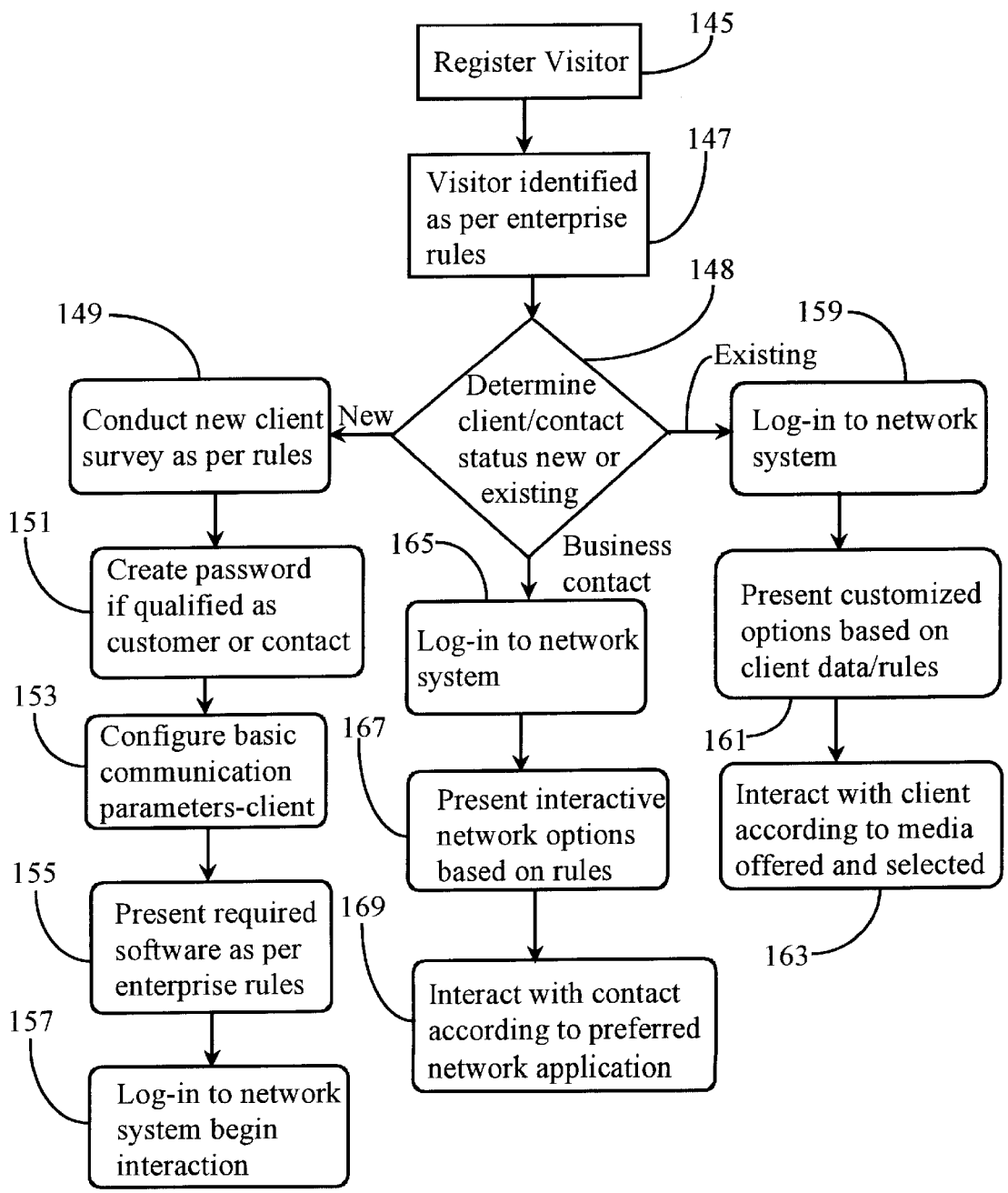
FIG. 6 is a flow chart illustrating media-presentation and customer-interface logic steps according to an embodiment of the present invention.

FIG. 6 is a flow chart illustrating media-presentation and customer-interface logic steps according to an embodiment of the present invention. In step 145, a visitor registers at an enterprise's WEB page. The visitor is identified according to enterprise rules in step 147. In step 148 CINOS determines the current status of the visitor after searching known client and contact data records. For example, the visitor may be a potential new client, an existing client, or an existing business contact. Although not specifically illustrated, a potential or new-business-client is not typically logically separated from a potential new-client until further process ensues in step 149 with regards to qualification via survey.

If the visitor wishes to be a client, he may log-in to the network system in step 159. Log-in may be automatic in the event that CINOS remembers the client's assigned password, or perhaps typing the password or other code may still be required for security reasons. At the time of log-in, window 133 is presented in personalized fashion according to client data and enterprise rules in step 161. In step 163, interaction between an enterprise entity and the client begins with a media type that is offered by the enterprise and selected by the client. An enterprise entity, as immediately described above, is herein defined as an agent, knowledge worker, service person, or any other live attendant, as well as any entity constituting an automated response action such as an automated fax, an IVR, automated file downloads, etc.

At step 148, if it is determined that the visitor is new, then a new client survey is conducted in step 149. Step 149 will determine if the new visitor is a client or business contact via the survey process. As described with reference to FIG. 6, the client survey may be conducted using a variety of known techniques and media. Presuming that a new visitor qualifies as a client or business contact in step 149, he or she may be asked to create a password in order to provide access to CINOS. In step 153, the client's appropriate communication and system parameters are recorded for future reference and for use in customizing window 133.

At step 155, a client instance of CINOS, or perhaps another enabling application, may be presented for download by the client. In some embodiments, there may be no required software for download. Therefore, step 155 may be considered optional in this regard. In step 157, the new client may log-in to the network system and begin interaction. Because the client, in this case, is accessing the system for the first time, the steps wherein he would obtain a customized window and begin interaction with an enterprise entity are not shown as intermediate configuration of media choices, product preferences, and the like, may still be required before a customized interface may be presented. In one embodiment, the client may not see a customized window until the next time he or she attempts to access the network.

Steps 165, 167, and 169 for an existing business contact as determined in step 148 are similar to steps 159, 161, and 163 for an existing client although the rules for interaction such as media used, personnel involved and so forth will be different. For example, in step 167 an existing business contact may be offered the option of using a network-collaboration program wherein I-phone, file sharing, video conferencing and the like are inherent to that one application.

It will be appreciated that there are many possible logic sequences or steps that may be followed in interfacing and enabling interaction between a client and an enterprise entity without departing from the spirit and scope of the present invention. FIG. 6 presents just one possible example of many.

It will be apparent to one with skill in the art that the rules governing the types of media offered to clients may be based on a combination of variables such as may be decided upon by the enterprise without departing from the spirit and scope of the present invention. Likewise, offered media types may be added or withheld from a client over a period of time based on such variables. Moreover, such additions or subtractions of media availability with regards to customer interface window 133 may be automated and based on calculated variables.

In one embodiment, a client may add or subtract media choices if desired, however, the enterprise may reserve the right not to engage such media if added by a client.

In one embodiment, special application-independent media viewers such as the viewer offered in section 139 of window 133 of FIG. 5, are offered to clients and possessed by agents so that initial illegible information may be made human readable regardless of the authoring application used by the agent or the client in the process of interaction.

Rules-Based Storage and Threading of Multimedia Interactions

In a preferred embodiment of the present invention, all CINOS controlled interactions with customers or business contacts are recorded and stored in a contact history comprising a MIS database and a text database such as were described with reference to copending application P3313PA, and described above. That is, actual multimedia interactions are recorded to one database or to a section of one database supporting all multimedia types used in the communication center, and text-based versions are stored in another database or portion of the same database. All of the actual recorded transactions and text versions are related as a threaded contact history which may be separate from or part of the same database as will be further explained below.

Figure 7:
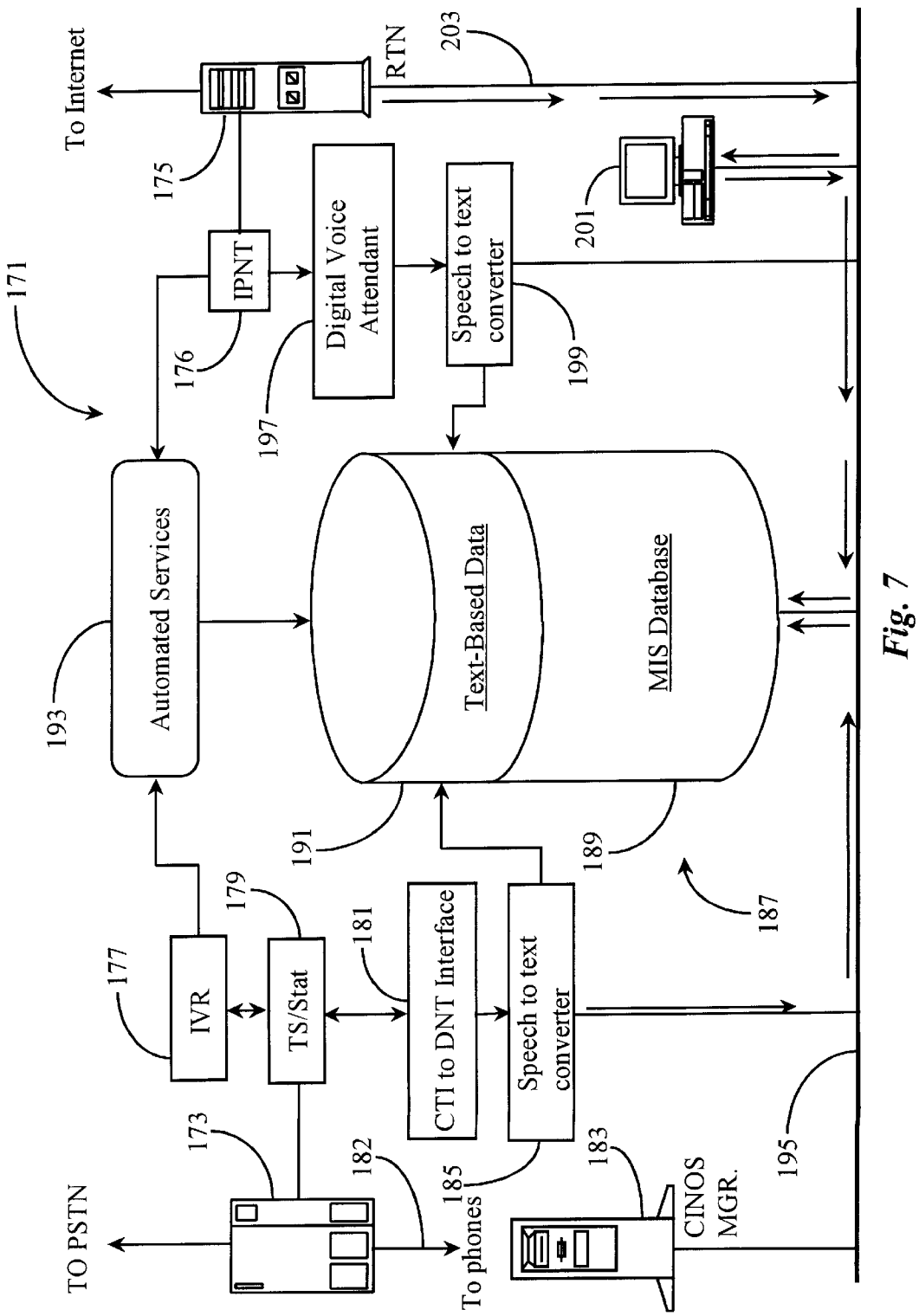
FIG. 7 is an exemplary overview of a multimedia interaction storage system within a communication center according to an embodiment of the present invention.

FIG. 7 is an exemplary overview of a multimedia-interaction storage system within a communication center according to an embodiment of the present invention. A system architecture 171 is illustrated solely for the purpose of providing just one of many possible architectures in which the methods and apparatus of the invention may be practiced. Architecture 171, which in a preferred embodiment comprises both conventional and DNT apparatus, is exemplary of an architecture that could facilitate CINOS according to an embodiment of the present invention such as is also the case of FIG. 1

At the heart of the storage system is a mass-storage repository 187 adapted to store multimedia interactions as well as text-based related files. Repository 187 may utilize any form of digital storage technology known in the art such as Raid-Array, Optical Storage, and so on. The storage capacity of repository 187 will depend directly on it's implementation with regard to the size of the communication center and predicted amount of data that will be stored and kept by the system.

In this example, repository 187 is divided logically into two sections. One section, multimedia information system (MIS) 189, is responsible for housing all multimedia interactions defined as media that is not text-based such as audio, video, and graphics-based media. All multimedia interactions are stored in MIS 189 whether incoming, outgoing, or internal. A second section, herein referred to as text section 191 is responsible for all text-based interactions as well as text versions related to non-text files. Sections 191 and 189 of repository 187 are analogous to MIS 79 and DB 75 of FIG. 3.

Repository 187 is connected to a communication-center local area network (LAN) 195. Repository 187 is accessible via LAN 195 to authorized personnel within a communication center such as agents, knowledge workers, or the like, and may, in some instances, also be made available to clients communicating with the call center. A network router (RTN) 175 is shown connected to LAN 195 via network connection 203. In this example, network router 175 is the first point within a communication center wherein DNT media arrives. Network router 175 is exemplary of many types of routers that may be used to route data over LAN 195. An Internet-protocol-network-telephony (IPNT) switch 176 is connected to network router 175 via data link as is known in the art. IPNT switch 176 further routes or distributes live IPNT calls that do not require routing to a live agent. IPNT calls that are routed to live agents are sent over connection 203 to LAN 195 where they reach agent PC/VDU's (not shown) or DNT-capable phones (not shown) as illustrated via directional arrows.

An object of the present invention is to record all multimedia interactions and store them in MIS 189. A further object of the present invention is to similarly record text versions of and text files related to all multimedia interactions and to store them in text-based section 191. For the purpose of the present invention, a text version of a non-text file is defined as a sufficient text rendition or description of a corresponding multimedia interaction. Still another object of the present invention is to provide an innovative mechanism wherein authorized persons may access any particular block of text and if desired, call up the actual media to which the text relates.

More detail regarding the order and manipulation of repository 187 is described further below.

Creating text-based versions of live multimedia interactions may, in some cases, be accomplished via an automated method. For example, a digital voice attendant 197 is provided and linked to IPNT switch 176. Digital voice attendant 197 may be of the form of a DNT-capable IVR or other digital voice-response mechanism as may be known in the art. Such automated attendants may interact with a voice caller instead of requiring a live agent. A speech to text converter 199 is provided and linked to voice attendant 197. As digital voice attendant 197 interacts with a caller, speech to text converter 199 uses voice recognition technology to convert the audio speech to text. Such text may then be stored automatically into text section 191 and related to the also-recorded audio data.

It will be apparent to one with skill in the art that as speech recognition technologies are further improved over their current state, which is adequate for many implementations, reliable text versions of audio transactions are not only possible but practical. Such speech to text conversions are used here only for the convenience of automation wherein no live attendant is needed to transcribe such audio data. The inventor is familiar with such converters as used in the CINOS system according to a preferred embodiment. Such converters provide convenience in the practice of the present invention but are not specifically required to achieve the objects of the present invention.

Manual transcription may also be used to convert audio/video to text or code that may then be entered into text section 191. For example, a live attendant 201 is shown connected to LAN 195. Attendant 201, in this case, may be given the responsibility of transcribing audio files from speech to text and annotating video or graphics files for the purpose of creating text files related to the non-text data. One or more live attendants such as attendant 201 may be provided for this purpose. Some media arriving at a communication center such as the one represented via architecture 171 will already be text-based and therefore require no conversion or annotation. Short e-mails, Faxes, word documents, and so on are part of this media category.

An automated services system 193 is illustrated as having a direct connection to section 191 of the data repository. System 193 is provided for certain text-based interactions, as described above, wherein a complete text record of the interaction may be mirrored, or otherwise created and stored into text section 191. Such automated services may include but are not limited to automated e-mail and fax systems. For example, a fax may be sent and mirrored into section 191 or, perhaps recreated using an optical character recognition (OCR) technique and then entered. Physical text-documents such as legal papers and the like, may be automatically scanned into text section 191 before they are sent to clients. There are many possible automated techniques for entering text files into a database. Such methods described with regards to automated services 193 are a convenience in practicing the present invention but are not specifically required to achieve the objects of the present invention.

With respect to the dual capability (COST/DNT) of architecture 171, a central telephony switch 173 is provided to be a first destination for COST calls arriving from, for example, a PSTN network. Switch 173 may be a PBX, ACD, or another known type of telephony switch. Internal COST wiring 182 connects telephony switch 173 to agent's individual telephones (not shown). Switch 173 is enhanced via a processor 179 running an instance of T-server and an instance of Stat-server, which are software enhancements known to the inventor and have been previously described. Such enhancements provide CTI applications, such as intelligent routing, but are not specifically required to practice the present invention. CINOS as previously described is adapted to be integrated with such software when present in a CINOS enhanced communication-center.

An intelligent peripheral in the form of a COST IVR 177 is provided for the purpose of interacting with callers seeking information and the like who do not require connection to a live agent. IVR technology may comprise voice response, touch tone interaction, or a combination of these technologies. IVR 177 is linked to processor 179 and also to automated services 193. An example of an IVR interaction may be the presentation to a caller of options for using an automated service such as those described above, or perhaps waiting for a live agent.

A CTI to DNT interface 181 is provided for the purpose of converting COST interactions to digital mode compatible with DNT so as to be adapted for digital storage and interaction according to CINOS functionality and enterprise business rules as described above. Interface 181 is not specifically required to practice the present invention so long as appropriate application programming interfaces (API's) are provided for equipment that interfaces with CINOS. Bi-directional arrows illustrated between interface 181 and IVR 177 represent the ability to route interactions in either direction. COST to DNT conversion may be accomplished in IVR 177 in addition to or in place of interface 181. The connection architecture presented herein is exemplary only.

A speech to text converter 185 is provided for converting audio from the CTI side to text for entering into text section 191 as was taught with regards to converter 199 on the DNT side. Actual recorded media interactions are illustrated entering MIS 189 after text versions are rendered and entered into section 191, however, this is not required. In some instances text versions of multimedia interactions may be rendered after the interaction is stored. There is no limitation regarding sequence. It is sufficient to say that converters 185 and 199 are capable of real-time conversion and entry.

Server 183 shown connected to LAN 195 is adapted to host a CINOS MGR.(operating system) application which provides control and organization with regard to various functions provided by the CINOS system as a whole. The storage architecture represented herein by element 171, and all it encompasses in this embodiment, is meant only to be an example architecture as may be dedicated to the storage and organization of communication-center data according to enterprise rules.

A unique method termed multimedia threading by the inventor is used in a preferred embodiment of the present invention for relating each multimedia interaction whether incoming to, out going from, or internal to the system, such as between an agent and a supervisor. This innovative process allows agents or other authorized personnel to access text data and ability cross-reference the data to actual recorded multimedia interactions which may be displayed and played back.

Figure 8:
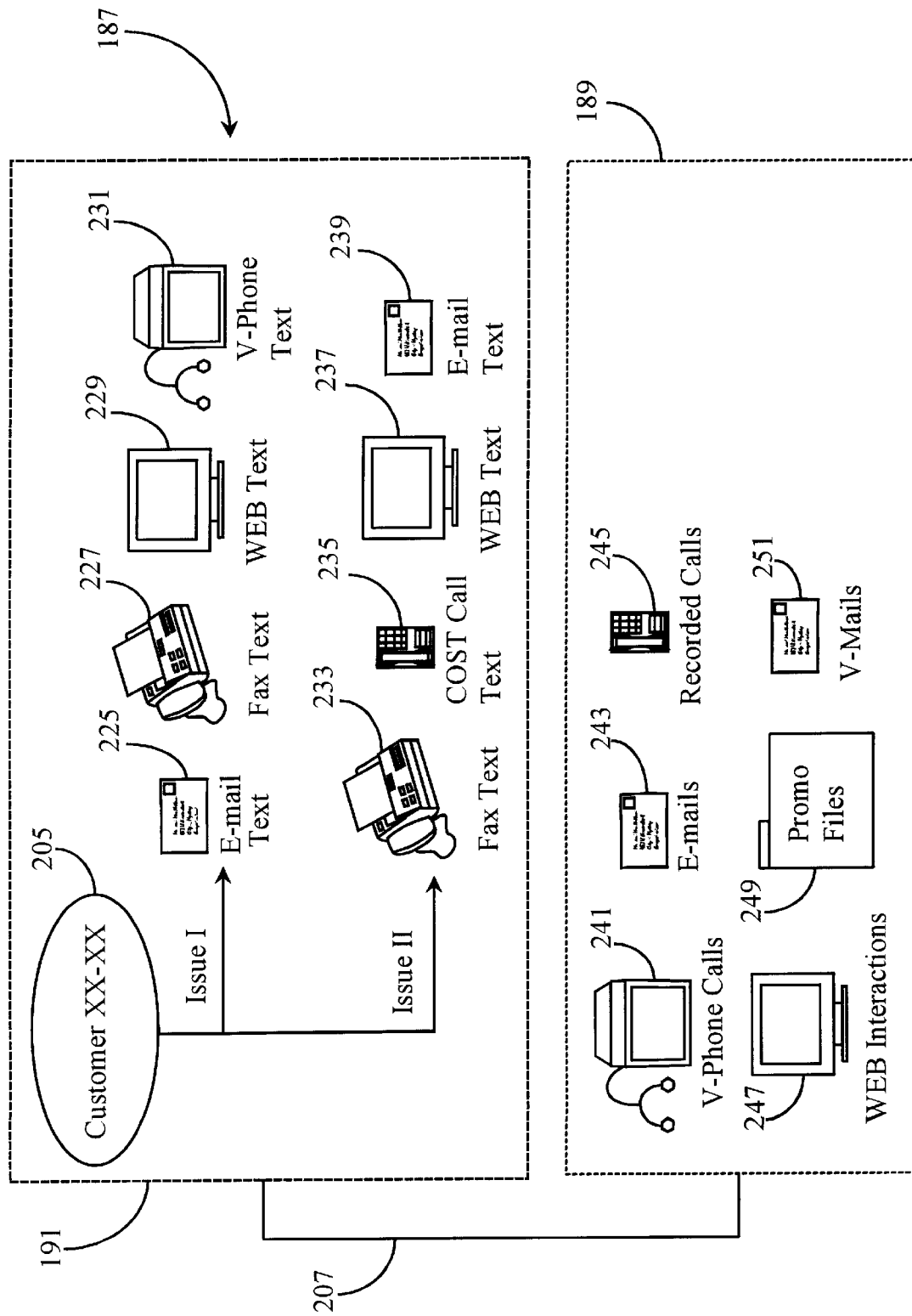
FIG. 8 is a block diagram of the repository of FIG. 7 illustrating threaded text-blocks and their relationship to stored multimedia according to an embodiment of the present invention.

FIG. 8 is an illustration of a relational diagram as might be displayed on a display monitor, representing entities stored in the databases described. The blocks of FIG. 8 illustrate threaded text-blocks and their relationship to stored multimedia according to an embodiment of the present invention. Repository 187 comprises section 191 and 189 as illustrated in FIG. 7. Section 191 contains text versions of interactions that are related by such as chronology, issue, participants, company affiliation, and the like. The text documents and versions of non-text files, represented in this case by icons, are shown related by serial position. For the sake of clarity regarding the innovative threading according to an embodiment of the present invention, a brief description of prior art threading follows.

Threaded dialog as is known in prior art involves a system of strings or threads that are identified as being inherent to a single entity or subject matter wherein the dialog (questions and replies) is about that subject or about a question or subject that an entity has brought forth. A threaded dialog may be finite dialog (is closed at some point) or it may be ongoing. Typically, a thread, which connects or associates the pieces of dialog, contains all of the dialog in the order that it happened such as in chronological order. Threading may be implemented based on other criteria as may be appropriate for a particular situation or by particular rules.

As previously described with reference to the background section, prior art threading techniques are confined to text such as with an on-line message board or the like. The inventor knows of no system that supports full multimedia interaction. The innovative implementation taught below integrates the text-based thread with stored multimedia interactions such that one may interact with the thread and access various stored media associated with the thread.

Referring again to FIG. 8, a customer 205 is illustrated as having two threads. They are issue I and issue II. Customer 205 has an assigned number XX-XX that identifies him or her with respect to the CINOS system. Issues I and II may comprise sales dialog, purchasing dialog, or any other type or purposed dialog as may be generic to the hosting enterprise. Customer 205 may well be a business contact, or even an internal agent practicing dialog with a supervisor or the like.

A series of icons a–d represent the type of media stored for each text block (text not shown). For example, issue I comprises first an e-mail text followed by a fax text, WEB text, and V-phone text. In this case, a time stamp or other known method may be used to insure that each text block is in order. Icons a–d are interactive pointers or links to the actual media interactions that they represent. That is, the first block of e-mail text is associated with an interactive icon, in this case icon a. By clicking on icon a with a pointer device, the actual e-mail may be accessed and viewed. In an alternative aspect, not only the actual transaction may be presented to a user for review, but related files may also be listed or otherwise presented for selection and review.

A logical link 207 represents cross-referencing capability between sections 191 and 189. Dialog may be threaded according to a wide variety of business rules. For example, a thread or string may represent dialog about a customer, product, agent, group of agents, group of customers, and so on. An identifier is assigned to an entity and to all the communication events to or from that entity, or those in which the entity may have been involved such as a group discussion or chat. In this way all interactions may be organized and stored accordingly.

In one embodiment, keyboard commands could be used to cross-reference to actual media instead of icons. In another embodiment, text versions of actual media are fully viewable with the text itself appearing in interactive form whereupon a double click may call up the associated media and so on. There are many variations within the scope of the invention.

Although actual recorded media interactions are, in this embodiment, stored in MIS 189, there does not have to be two separate databases (one for text and one for actual media). All data may reside in one database and be sectioned in storage. For example, one click on the customer name may bring up text only, while a double click on the text brings up the associated media.

In MIS 189, recorded multimedia interactions are represented by icons I–IV and VI. For example element I represents all recorded Video phone interactions. Element II represents all e-mails. Element III represents all recorded COST interactions. Similar associations are made with respect to elements IV and VI which represent WEB interactions and Video mails respectively. WEB interactions IV may include on-line orders, requests, information forms, signed certificates, and so on.

Element V represents additional stored multimedia files dedicated to, for example, promoting the enterprises products or services. Promotional files V may contain files of the form of any enterprise supported multimedia. These files may be tools that can be sent to clients upon request or perhaps periodically.

Referring again to section 191, element b located on the thread labeled issue I represents text from a fax. Because a fax is text-based and not a multimedia interaction, there is no corresponding media event associated with it. However, the fax is threaded into the dialog according to, in this case, chronological order. A short example of a proposed dialog concerning issue I follows.

Element a represents an e-mail sent by customer 205 to the enterprise requesting pricing information. An enterprise agent responds with a fax (b) to customer 205 containing the requested information. Customer 205 then places an on-line order (element c) along with a request for confirmation via video phone (element d). Issue I may be closed at this point. Issue II may represent a threaded dialog concerning company service with regards to the customer order of issue I, or perhaps an agent-to-manufacturer dialog regarding how the order was handled with respect to issue I.

In accordance with CINOS functionality as previously taught in descriptions above, data may be mined from repository 187 for the purpose of enhancing service to customer 205. Mined data may be used to affect routing of interactions, product promotions or advertisements that may be sent to customer 205. In some cases, mined data may effect new dialog with a customer or business contact resulting in new thread additions. A complete contact history with interactive linking to actual recorded media enables the enterprise to resolve disputes more easily, better service the customer, and enhance profitability for the enterprise.

Figure 9:
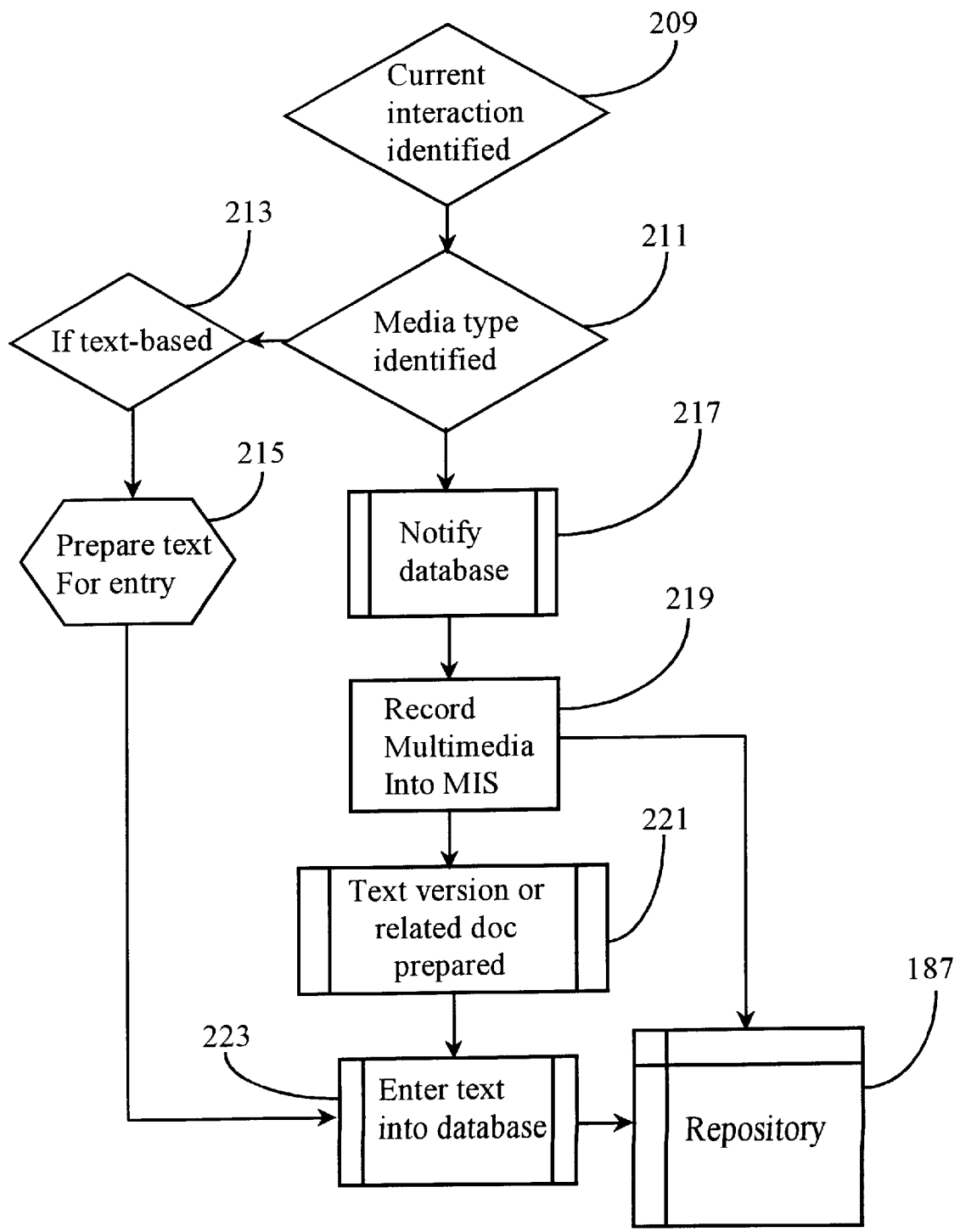
FIG. 9 is a process flow chart illustrating logical steps taken when building a threaded multimedia contact-history of communication-center interactions according to an embodiment of the present invention.

FIG. 9 is a process flow chart illustrating logical steps taken when building a threaded multimedia contact-history of communication-center interactions according to an embodiment of the present invention. Logical process steps as illustrated herein are meant to represent just one of many sequences which may be implemented when building a multimedia-threaded contact-history. Actual steps will depend on enterprise rules. In step 209, a current interaction to be recorded is identified. Identifiers may include special passwords or codes for identifying the contacts involved with the interaction. The media type of the interaction is identified in step 211. If the media type is already text-based, as confirmed in step 213, then the interaction is prepared for entry into a database such as section 191 of FIG. 8. Preparation may include such automated processes as scanning, mirroring, file conversions, and so on. Manual annotation via live attendants such as attendant 201 of FIG. 7 may also be performed. In step 223, the text interaction is entered into section 191 of repository 187 and takes it's place along the associated dialog thread according to enterprise rules.

If the interaction is of the form of non-text media as identified in step 211, then the MIS section of repository 187, or section 189, is notified to accept the input. At step 219, the non-text interaction is recorded into section 189 of repository 187. This may occur in real time as the interaction takes place, or some point after the media interaction was recorded.

In step 221, a text version of the recorded media or a text-based document related to the transaction is rendered for storage into section 191 as part of the thread. In some instances, as described with reference to FIG. 7, step 221 is automated via speech to text converters and occurs at the same time or before the recorded multimedia interaction is entered into section 189. In other instances, text versions of multimedia interactions may be rendered after the recorded interaction is stored. A live attendant such as attendant 201 of FIG. 7 may be assigned to parse video and or audio for applicable text. Such parsed text is entered into section 191 and takes it's place along the thread as was described above.

In all cases, an identifying medium is used to assign portions of an ongoing dialog to the proper location along a thread as well as provide identification to actual recorded media for cross-referencing such as may occur during a system audit or contact review. Further, the appropriate icons and or links are created and associated to entered text wherein actual multimedia may be cross-referenced in interactive fashion. Hence, the type of media may be readily identified by an auditing or reviewing agent simply by browsing the threaded text with accessibility to the recorded events made by interactive method such as clicking an icon with a pointer device as was previously described. As an additional benefit all of the threaded dialog, whether text based or not, is rendered in a form that data mining may be used to create many useful relationships and to derive much useful information from the stored data.

It will be apparent to one with skill in the art that the order and specific function of logical steps as taught herein may vary according to the type of enterprise, existing enterprise rules, and so on. For example, instead of threaded dialogs being inherent to a specific customer with the dialog being about the customers interactions, it may be specific to a particular agent with the dialog about the agents activities. Such differences in thread assignment may be incorporated into one rules-based repository.

Interactive Multimedia Viewers and Applications

In a preferred embodiment of the present invention, CINOS users comprising such as customers, agents, and business associates are provided with innovative multimedia applications that are containers for dedicated multimedia viewers enabling a particular user to perform a dedicated function or functions including gaining access to and viewing media from selected areas of CINOS data storage. Provision of such applications allows any objective to be gained regarding virtually any aspect of the enterprise. These interactive applications are built from a parent application or container that may contain all of the interactive modules that may be desired to effect a specific application to be presented to a user having a need for such an application.

According to various embodiments of the present invention, which are described below, the multimedia applications may be adapted for such tasks as placing orders, previewing products, determining customer profitability, calculating sales volumes, reviewing agent performances, or any other enterprise-conceived objective. The abilities and constraints applied to these unique applications are limited only by the imagination, and tools available to an authorized programmer or worker, such as a knowledge worker, who creates the applications.

Figure 10:
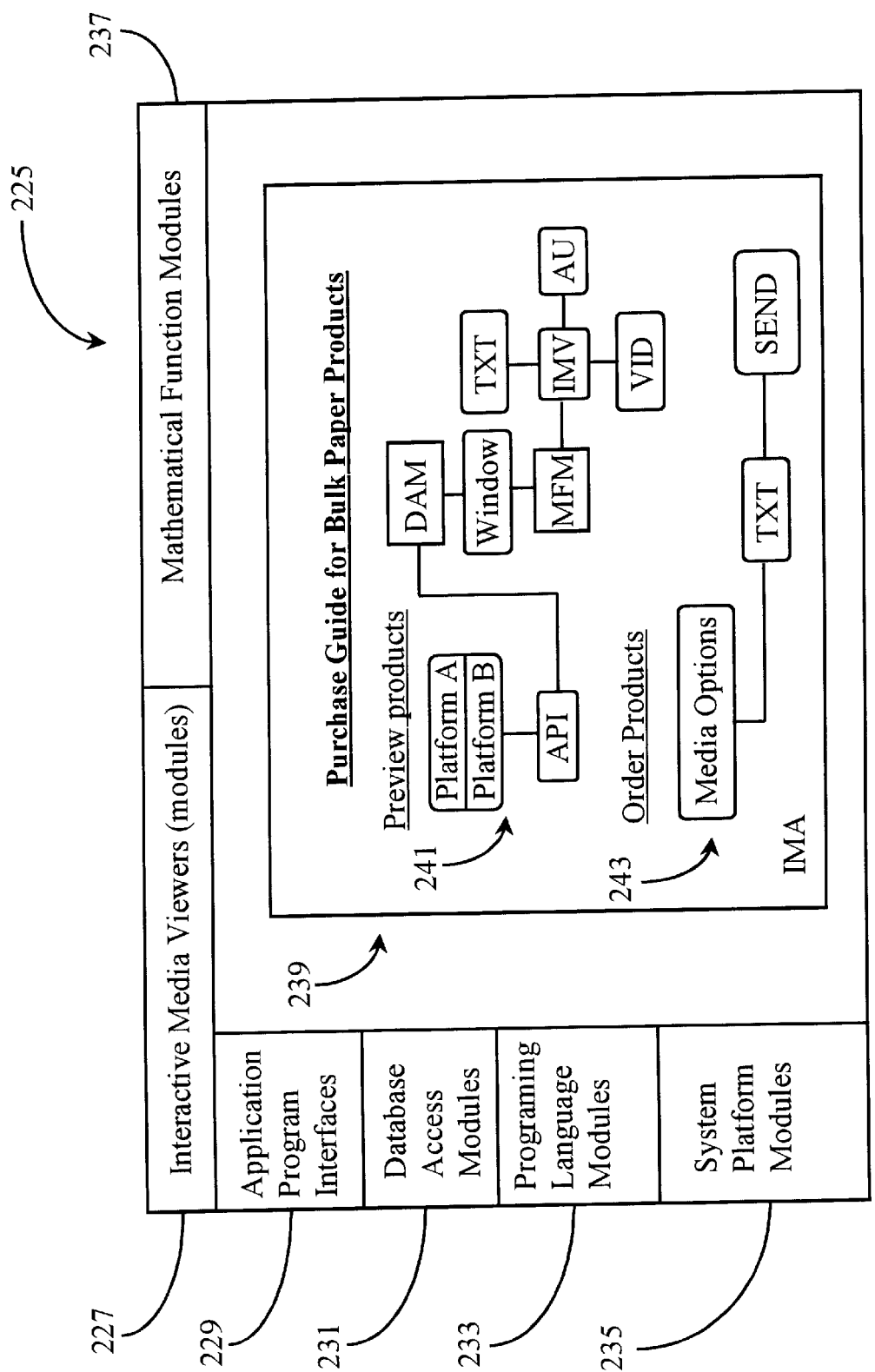
FIG. 10 is a block diagram illustrating an interactive multimedia application (IMA) tool kit and a created application according to an embodiment of the present invention.

FIG. 10 is a block diagram illustrating an interactive multimedia application (IMA) tool kit and a diagram of a created IMA application according to an embodiment of the present invention. An IMA tool kit 225 is provided to an authorized programmer, which may be a knowledge worker, for the purpose of creating special multimedia applications such as an IMA 239 (illustrated within tool kit) for users of CINOS, wherein users may access and interact with certain pre-selected data for the purpose of reaching decisions and performing certain dedicated objectives as may be defined by enterprise rules. IMA tool kit 225 contains executable codes or modules represented as building blocks by the inventors. These modules may be used by themselves for certain functions, or may be linked to each other to provide additional function in a programmed order. A good example of such a module would be a combination of COM codes used to build an interactive graphical interface (module), and the like.

Among these functional modules are interactive media viewers (IMV's) 227 which are provided and adapted for viewing certain media supported by the enterprise hosting a communication center employing CINOS. Supported media types may include but are not limited to telephony (traditional or IP), interactive voice response (IVR), e-mails, WEB embedded interfaces or forms, faxes, chat programs, multiparty threaded discussions, etc. IMV's 227 are unique in the fact that they are dedicated viewers including an interactive layer that enables viewing of only pre-selected media as defined by enterprise rules. For example, CINOS users may be assigned an identification code or number which will also be tagged to all of their stored interactions as described elsewhere above with reference to FIG. 9. These codes may be used to associate individuals with limitations and constraints from viewing media that is not part of their own contact history (for example). Other limitations or constraints may also be applied to IMV's 227 as may be conceived and implemented by a programmer such as playing or viewing interactions of certain dates, playing or viewing interactions about certain subjects, and so on. An editable software layer inherent to each viewer enables a programmer to build such constraints into a particular viewer, and to add the edited viewer to an IMA Application Program Interfaces (API's) 229 are provided to allow a user to send obtained data or calculated results to connected peripheral devices or software modules or applications as may be required for operations such as printing, faxing, sending over a network, etc. If it is desired by enterprise rules, for example that a customer be able to print certain text or graphic information obtained through IMA 239, then the appropriate interface may be provided.

Database Access Modules (DAM's) 231 are provided for allowing access to normally restricted databases that may be connected to CINOS architecture. Such databases will of course include multimedia information systems (MIS), customer information systems (CIS), which may also include contact and agent associated data, external databases such as may be hosted by the enterprise, and so on. Constraints may be applied to DAM's 231 pertaining to which and or what portions of certain databases may be accessed by an application.

Programming language modules 233 are provided and adapted to facilitate the type of platform/system that an IMA such as IMA 239 will be created for. One IMA such as IMA 239 may be adapted to run on a variety of system types and platforms. System platform modules are provided as API's for intended supported system/platform combinations. Mathematical function modules (MFM's) are provided and adapted to interact with CINOS databases for the purpose of performing pre-selected calculations such as cost averaging and so on.

In this particular embodiment, IMA 239 is a finished application ready to be distributed. IMA 239 contains default display modules (not shown) for the purpose of enabling computer screen display on a user's system as is known in the art. IMA 239 may be stored in a special applications server (not shown) connected to the CINOS network either at WAN level or at the level of the hosting communication center. The method of distribution for IMA's such as IMA 239 may be of the form of a WEB-based client presentation to a user such as in customer window 135 of FIG. 5, for example. IMA 239 may also be of the form of a browser plug-in accessible via a server such as may be the case with a special applications server as described above. In other instances, such applications may be made a part of an agent's desktop and so on. There are many and varied possibilities.

In this particular embodiment, which is exemplary only, IMA 239 is of the form of an interactive purchase guide for bulk paper products as illustrated via underlined title. IMA 239, in this example, is logically separated into two distinct operations or functions. These are operation 241 and operation 243. Operation 241 is a product preview interactive guide, while operation 243 is an order guide. The number of operations built in to an IMA such as IMA 239 will depend upon the intended purpose of the application according to enterprise rules.

For exemplary purposes, assume that IMA 239 which is, in this case, a purchase guide for bulk paper products, is to be presented to a corporate buyer who is new on the job.

Because he is new, he may be uncomfortable with his own knowledge of how much or what kind of paper to buy. His predecessor may have a long purchase history with the enterprise. Therefore, he requests an IMA such as IMA 239 that will allow him to preview products, browse the past purchase history of his predecessor, and perform a calculation that averages, by month, the last years paper purchases made by his company.

According to enterprise rules, IMA 239 adheres most closely to the buyer's request. That is, It allows for preview of products (241), and leads the buyer toward an order (243). IMA 239 may, in some instances, be designed specifically for one buyer if it is determined that his level of business contribution warrants it. However, in most cases, IMA applications such as application 239 will be more generic with interchange between different users accomplished with some editing performed based upon the intended use of the application and user parameters.

A communication center may provide a number of standard IMA's with each IMA adapted to a different objective. A communication center may also provide custom-built MIAs for any specific purpose. A certain amount of editing ability renders one IMA usable in more than one situation.

Referring now to IMA 239, as previously described, operations 241 (product preview) and operation 243 (order guide) are available and related to purchasing bulk paper products. Operation 241 begins by presenting two different platform options from which a user may select. A platform A may be a Windows platform, and a platform B may be a UNIX platform. There may be more or fewer options regarding platforms. Similarly, applicable modules such as may be generic to a certain platform are installed with each platform. In this way, one application may be run on differing platforms.

An API, labeled as such, shown logically connected beneath platforms A and B is illustrative of an interface for linked modules depended on platform choice. A database module (DAM) is first logically connected to the API module previously described. The DAM controls which database or databases may be accessed by IMA 239. A window shown immediately beneath the DAM provides an edit interface wherein the author or programmer may insert additional constraints, such as allowing access to only certain database sections and so on.

A mathematical function module (MFM) labeled as such is shown beneath, and logically connected to the edit window. MFM is adapted to allow prescribed mathematical operations to be performed relative to database information such as cost averaging, grouping by product preference, and so on. Various modules as have been described herein may bring up additional displays on a user's computer if the module in question offers a choice of operation or returns readable results. Furthermore, standard preview modules (not shown) may be presented as object models and invoke standard viewers such as may be installed on the user's computer system.

An interactive media viewer block (IMV) shown logically connected to MFM, allows the user to view pre-selected media interactions that are persistently stored in a database such as MIS 189 of FIG. 7. The IMV block shown may represent a plurality of unique IMVs or a single IMV. In this case three IMVs are involved, and these are represented by the blocks labeled TXT (text), VID (video), and AU (audio). Each individual IMV has an edit layer wherein a programmer may apply limitations or constraints relative to viewing capability. In some cases the same limitations may be applied to all the IMVs of an application in one editing sequence, such as by doing one edit and copying that edit to other IMVs. Although there are three illustrated viewer modules that make up the IMV in this example, more or fewer viewer modules may be used depending upon the intended use of IMA 239 and enterprise rules.

Although not explicitly shown, each IMV is editable through a software layer. In this way, a user may be limited to viewing certain media interactions and transactions that are allowed via enterprise rules. For example, TXT viewer may only be able to view e-mails from the user and agent in a specific interaction thread, but not intermittent e-mails on the thread that may be from agent to agent or supervisor to agent and so on. Because each interactor with CINOS has an identification, and all interactions from or to them are so identified, these identifiers may be used in the edit layer of each viewer to constrain the user. In this way, a user may be granted access to a history database and view only his interactions without imposing on other users who share the system. Likewise, agents or supervisors charged with the task of reviewing the activities of certain other agents may use applications such as IMA 239, adapted for the stated purpose, and be constrained in terms of whose interactions (agent's) may be viewed, and so on. In this manner full use may be provided to specialized users without exposing otherwise sensitive information that is not pertinent to the user or the purpose of the IMA.

Operation 243 created to allow a user to place an order for products is, in this case, a logical close for the previous operation. A module labeled Media Options may present standard media choices that the enterprise accepts for placing an order such as IP phone, e-mail, and so on. A connected text module (TXT) allows the user to send a quick text order while on-line. A send button sends a completed order to the enterprise.

It will be apparent to one with skill in the art that an IMA such as IMA 239 may be programmed for virtually any enterprise objective without departing from the spirit and scope of the present invention, such as those already described. By utilizing pre-built modules instead of writing codes line-by-line, programmers may greatly increase the efficiency of application preparation and presentation to users. In many cases only slight editing is required to present a new application to a particular user. By using COM, and other known conventions such as Java, applications are quickly assembled or modified as has been taught herein.

Figure 11:
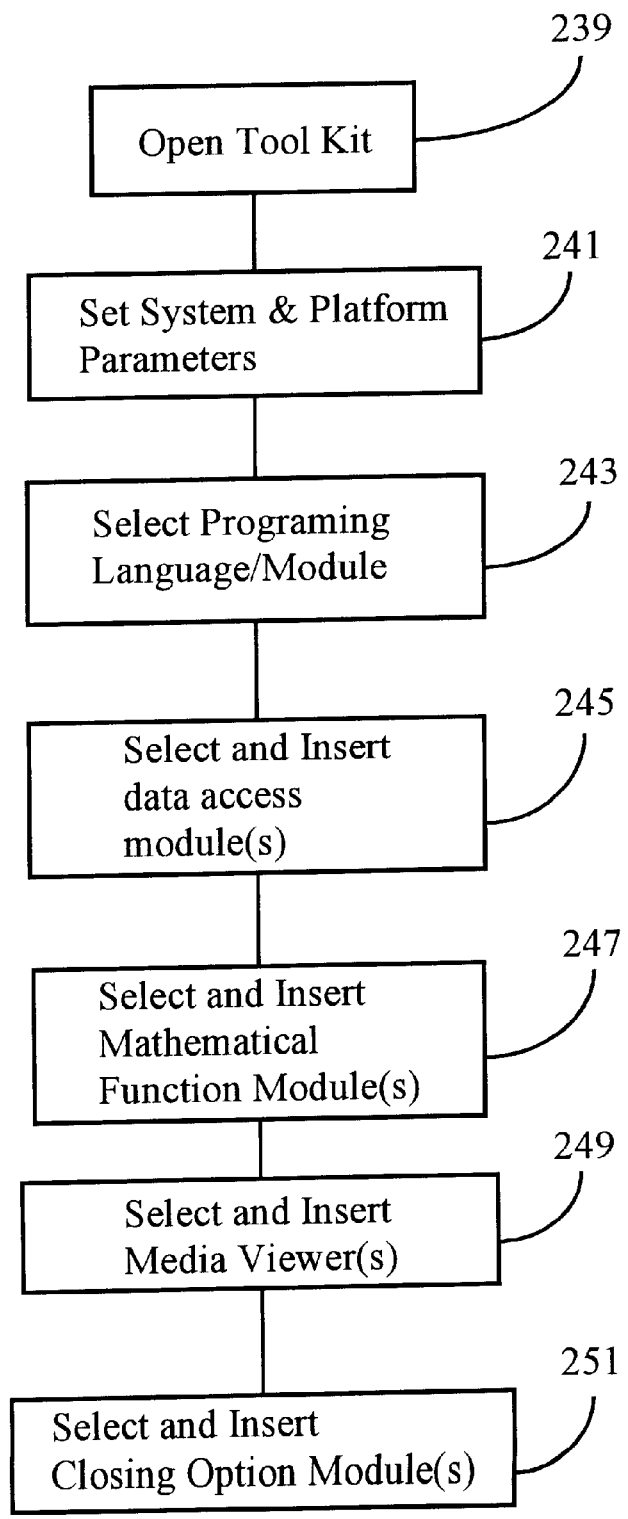
FIG. 11 is a process flowchart illustrating logical steps for building an IMA for a user interacting with CINOS according to an embodiment of the present invention.

FIG. 11 is a process flowchart illustrating logical steps for building an IMA for a user interacting with CINOS according to an embodiment of the present invention. The process described below is meant to be just one example of many differing processes that may be implemented when building and customizing an IMA such as IMA 239 of FIG. 10. The process components and order of which they are assembled will depend largely upon the type and purpose of the application being assembled and enterprise rules.

In step 238, the programmer or application author opens his tool kit. Such a tool kit may be part of tool kit 125 of FIG. 4 on a CINOS desktop interface. In step 240, the author sets system and platform parameters. That is, he inserts the proper functional modules for use of the application on specific platforms and or system types. For example, the author may set up one application to run on more than one platform or system such as IBM and Macintosh. It should be noted here that if more than one type of system is supported in one application, then the associated modules will need to be included as well.

In step 242, the author selects a programming language module containing libraries of known programming languages and codes. As known in the art, there are different programming languages used for different platforms. The author, in addition to building with pre-assembled modules, or building blocks, may have to write certain functional code in the supported language. In a preferred embodiment, the author has access to these language libraries from within his tool kit.

In step 245, database access module(s) (DAMs) are selected and inserted. As previously described with reference to FIG. 10, these modules will determine which and what portions of databases may be accessed. In an alternative embodiment these restrictions may also be a part of the editable layer of IMVs. Step 247 covers mathematical functions relative to selected databases. Mathematical function modules (MFM's) allow a user to perform pre-defined operations. MFMs may or may not be needed in an IMA. This step may be omitted if no such functions are requested by a user or otherwise required in an application.

In step 249, interactive media viewers (IMV's) are created using viewer modules adapted to view certain media of the type that stored interactions comprise. An IMV is a module that may comprise one or more than one media viewer. Each of these viewer modules are editable (via software layer) and may function alone or as a component of a larger module (comprising more than one viewer).

In step 251, closing modules are inserted to complete the application. For example, order modules are one example of a closing modules. Modules adapted to return displayed results would be another example. Moreover, peripheral device API's may be inserted to allow results to be printed, faxed, sent over the network, etc. In this way, a supervisor reviewing the performance of a group of agents may report to other concerned parties such as managers, enterprise board members, or the like.

The example as illustrated herein is basic but is deemed adequate by the inventor for illustration of one typical IMA building sequence. The description and order of steps may vary considerably.

IMA's such as IMA 239 are transportable over a network and may be stored on a special applications server at network level, or within the communication center. In some embodiments, user's will be connected to the Internet when using IMA's allowing CINOS access. In other embodiments, agents may access CINOS resources while working off-line with respect to the Internet. In such cases, logging on to CINOS is still required.

It will be apparent to one with skill in the art that IMA 239 as taught herein is interactive and displayable on a PC/VDU that is logged into CINOS through a WAN. However, this is not specifically required to practice the present invention, but rather preferred. Other embodiments may include presenting a CTI interface such as an IVR wherein a user may interact with the application via voice or touch tone response.

In still another embodiment, such applications may be presented via external media such as on a floppy disk(s) or CD-ROM wherein a user may, by inserting the disk or CD, obtain the ability of accessing the enterprise via WAN, gaining access to CINOS, and performing an objective with the IMA.

Stored-Media Interface Engine (Interaction Object Model)

An object of the present invention is to allow certain CINOS systems to utilize data, such as data about customers, contacts, business associates, products and agents, to accomplish objectives and to effect improvements in overall system performance. Such data must be utilized very quickly in order to aid in influencing such system objectives as efficient routing to clients based on client data, or as another example, generating an updated sales-volume report based on an entire customer base's latest transactional history. Certain CINOS automated systems will have to be able to make decisions in a time frame that would not be sufficient to allow physical accessing of actual media. Therefore, an innovative interface between stored multimedia data and various CINOS intelligent systems is provided and taught below.

According to a preferred embodiment of the present invention, a stored-media interface engine is provided in the form of an interaction object model (IOM). This unique convention provides a system-accessible abstract of all stored interactions within a multimedia communication center.

Figure 12:
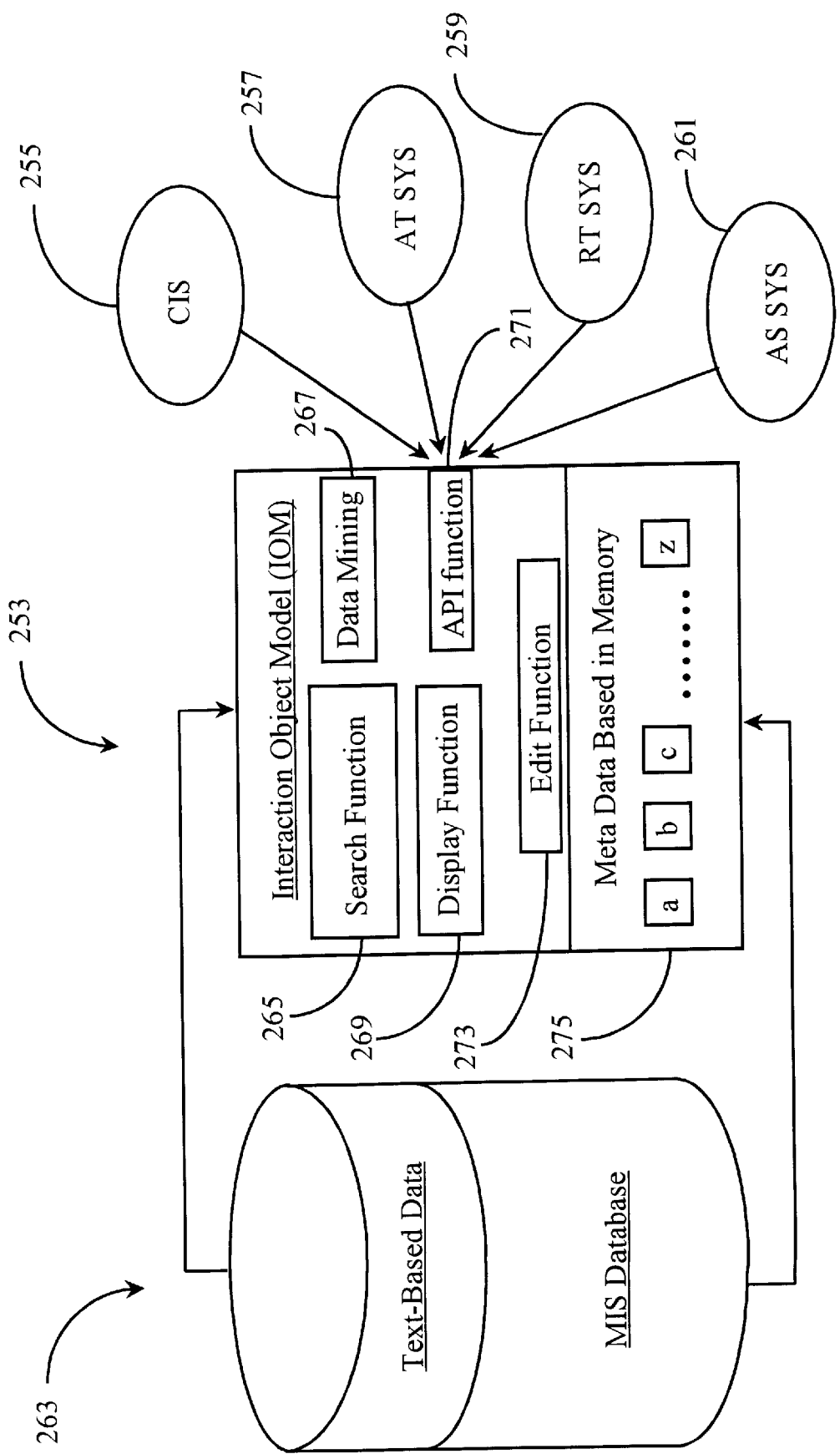
FIG. 12 is a block diagram illustrating the relationship between a mass repository, an interaction object model (IOM interface), and data-interaction systems according to an embodiment of the present invention.

FIG. 12 is a block diagram illustrating a relationship between a mass repository 263, an interaction object model (IOM interface) 253, and several data-interaction systems according to an embodiment of the present invention. Interaction object model (IOM) 253 functions as a memory-based interface-engine between mass repository 263 and a variety of CINOS data-interaction systems illustrated in this example as customer information system (CIS) 255, audit system (AT SYS) 257, routing system (RT SYS) 259, and automated services system (AS SYS) 261. It will be apparent to the skilled artisan that there may be many different interaction systems, and the ones illustrated here are exemplary.

Repository 263 is analogous to mass repository 187 of FIG. 7. It is logically divided into two sections. One section is for threaded text labeled Text-Based Data, and one is for multimedia storage labeled MIS Database. All of the communication center's interactions and transactions in this example are persistently stored in repository 263.

Automated CINOS systems such as systems 255 through 261 are adapted to interact with data stored in repository 263 in order to perform their intended functions related to CINOS operation. For example, CIS 255 uses data in repository 263 for presenting information to agent's at the time of or ahead of a live interaction. AT SYS 257 has to access and process data for generating system audits. RT SYS 259 requires data for intelligent routing purposes. AS SYS 261 uses data to update and configure services such as faxes, e-mails, voice messaging, and the like.

IOM 253 is adapted to function as an interface between repository 263 (hard data) and the data interaction systems as described above. IOM 253 is an object model comprising objects as representations of stored files in repository 263, such as non-text files of recorded transactions. Each object making up the model is a representation of one such file. In a preferred embodiment, IOM is a COM-based model with which other CINOS COM-based applications may readily interact without language conversion interfaces. However, in other embodiments, API's may be provided where language differences are present.

IOM 253 has various capabilities in various embodiments which may include, among other functions, a search function 265 adapted to accept parameters as a guide to obtain requested information from IOM memory (element 275). There is in this embodiment a data-mining function 267 adapted for mining hard data and converting mined data into suitable code for applying to memory objects (represented interactions). A display function 269 is adapted to enable data results to be displayed on suitable screen monitors which may be associated with various data interaction systems as previously described. An API function 271 provides appropriate interface for linking interaction-data systems such as systems 255–261 to IOM 253. An edit function provides editing ability to object parameters by system applications which may, in some instances be automated, or, in other instances, manned by administrators or knowledge workers. An object memory 275 is a single file containing all of the objects which represent all of the communication center's stored interactions.

IOM 253 is run in much the same way as a standard relational object model as is known in the art, except that it is confined to text data and capable of multi-tasking (performing multiple simultaneous and unrelated functions) with respect to multiple system access. Another marked difference from a standard object model is the data mining functionality 267. In a preferred embodiment, function 267 may be used to add additional data to IOM memory in real time.

IOM 253 uses metadata, meaning data about data, in it's abstract representation of hard data files stored in repository 263 similar to other data warehousing systems. Such metadata may be, in some embodiments, compressed in memory for economy in storage. In a case such as that described above, a compression and decompression function would be added to IOM 253. IOM 253 utilizes memory area 275 for storing metadata objects a–z as illustrated. Metadata objects a–z, as illustrated, each represent a single transaction or interaction file stored in repository 263. Hence, the number of actual objects stored in memory 275 will equal the number of interactions stored in repository 263, if every stored transaction is shadowed in the IOM.

IOM 253 is innovative in the fact that it is an object model interface used as an accessible abstract representation of hard data files. Therefore, data-interaction systems may typically utilize IOM 253 in performing their dedicated functions without accessing any hard data stored in repository 263. The inventor knows of no system wherein data systems may obtain stored information to aid their dedicated functions in the manner and with the apparatus described above.

Memory 275 is typically located in repository 263 as is the rest of IOM functionality as illustrated via directional arrows emanating from repository 263 and pointing to a separate IOM 253. Software adapted to communicate with IOM 253 (not shown) may reside in each of the data-interaction systems 255–261 as illustrated via directional arrows pointing to API function 271. The above described relationship is not specifically required to effect the goal of the present invention, but rather preferred in it's practice. IOM 253 may reside on a separate database that is linked to repository 263. Similarly, API function 271 may contain all of the necessary components for interface with all communication center data-interaction systems without requiring each system to host software. There are many differing architectural possibilities.

According to an embodiment of the present invention, IOM 253 is continually updated in real time as interactions may be stored or deleted in repository 263. Rules-based routines determine what type of data will be used in each meta-data object stored in memory 275. Typically, enterprise important information such as client ID, client parameters, transactional analysis (such as profitability rating), credit rating, and so forth, will accompany more interaction-specific data, such as media type, interaction date, participating party ID's and their parameters, and any parsed information specific to the interaction and known to be required by one or more of the automated services. Interaction-specific information may include interaction purpose or goal, interaction results such as purchase information, resolved issue information, and so on.

Memory objects, such as objects a–z representing interactions, are not only identified with regards to involved parties as previously described, but may also be identified and associated according to the common thread order of interaction as represented in repository 263, or more specifically, the text-based portion which is threaded dialog.

It will be apparent to one with skill in the art that an IOM such as IOM 253 may be utilized with databases other than repository 263 without departing from the spirit and scope of the present invention. For example, IOM 253 may also be used as a system interface to product information databases, external knowledge databases, or virtually any other database such as may be connected to CINOS or a similar operating system.

Figure 13:
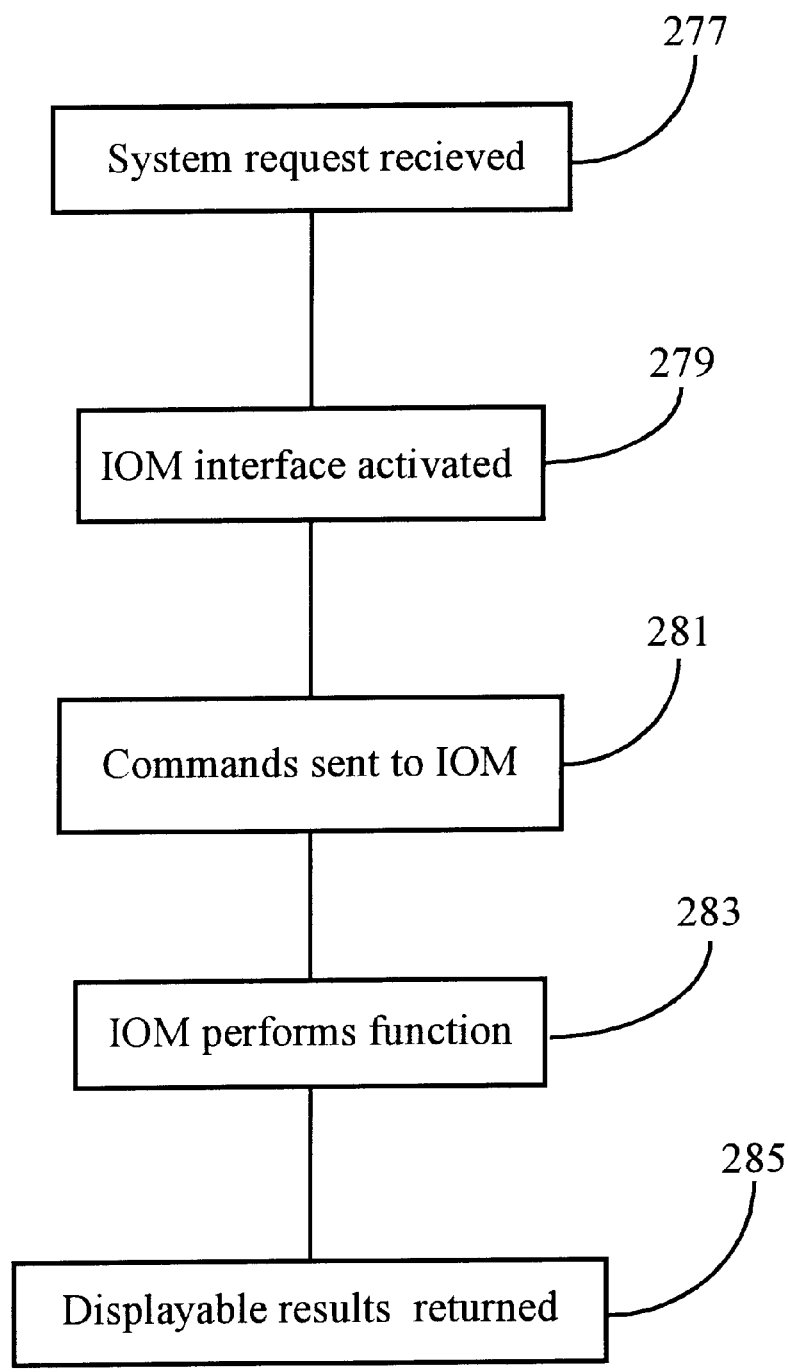
FIG. 13 is an exemplary flow chart illustrating interactive steps associated with IOM functionality according to an embodiment of the present invention.

FIG. 13 is a flow chart illustrating interactive steps associated with IOM functionality according to an embodiment of the present invention. The following basic example of IOM functionality is meant to illustrate just one possible sequence of logical steps taken when utilizing IOM 253. This example should in no way limit the present invention in terms of the broadest scope to which the present invention should be afforded.

In step 277, a request to access an IOM such as IOM 253 of FIG. 12 is received from a data-interaction system such as RT SYS 259 of FIG. 12. In step 279, the IOM is activated to receive commands related to a dedicated operation or pre-defined process. Activation in this sense is defined as activation to receive from or communicate with a specific requesting system.

In step 281 commands are sent to the IOM for the purpose of initiating IOM functions as may be desired. In step 283, the IOM performs the requested function or functions. In this case, the function or functions are adapted to provide information to be used in routing of a new interaction. A simple example of a routing-related function would be to return the information associated with the identified client's last 5 interactions in order to determine a best fit agent to accept the new interaction. If it is determined that the last 5 interactions are leading to a purchase, and the prominent agent involved in the last 5 interactions is identified, then the new interaction may be held for that agent in the hopes that statistically, he is more likely to obtain a new order from the client. However, if the last 5 interactions are stagnant or leading away from a purchase, than the interaction may be routed to a new agent, perhaps with more skill at motivating clients to buy, and so on.

In step 285, displayable results from performed functions are returned to requesting systems. In some instances, results will not be required to be human readable or to be displayable on a monitor. However in other instances, this may be required such as an instance wherein data about a client is forwarded to the receiving agent ahead of the clients interaction.

It will be readily apparent to the skilled artisan that the process steps described above may vary in number and description according to type of business, type of data-interaction system requesting information, enterprise rules, and type of data accessed. This basic example is meant to provide a broad scope of functionality.

Interactive Modules for Managing Business Processes

In a preferred embodiment of the present invention, a multimedia communication center operating CINOS according to previous co-related embodiments is provided, as part of CINOS, a means to initiate and manage various business processes related to communication workflow. Such business processes are defined as enterprise-created applications, procedures and so forth, that are adapted to return a result or provide a solution regarding an issue or request made by a client or other entity.

As briefly described in the background section above, in a multimedia communication center it is desired to automate business processes where possible and to be able to break down the processes into tasks and sub-tasks that are strictly controlled and timed. Prior art network systems require considerable human intervention while proceeding with a business process while, for example, a client waits for a resolution. Similarly, more time is consumed because actual media and hard data may be accessed and processed without the benefit of an abstract representation of data (metadata) as discussed above relative to an interaction object model (IOM). Therefore, an Interactive Process Model (IPM), is provided as a generic programmable module, which when complete, represents and conducts a defined business process. An IPM according to this invention has ability to obtain data from an IOM and to manage business applications in terms of timing and execution of main tasks and sub-tasks that are programmed according to enterprise rules.

FIG. 14 is a Gant table illustrating a pre-defined business process according to an embodiment of the present invention. A Gant table 287 represents the tasks and sub-tasks of a business procedure, in this case qualifying an exemplary loan application, as they might appear on a programmers screen after an automated execution sequence has been completed. Gant table 287 will hereinafter be termed Interaction Process Model (IPM) 287 for the purpose of simplifying explanation.

IPM 287 is a programmable interactive engine as previously described. That is, one may program IPM 287 according to various tasks and sub-tasks that may be required for the execution of a particular business process. After basic programming or set-up, IPM 287 has the capability of accessing data from, among other possible sources, the IOM described above, and using that data in the execution of it's intended goal. IPM 287 is innovative in the fact that it begins as a generic object model (for example a COM container) in which a programmer may add specific functionality (COM objects) to create a functional interface engine or model that may execute a timed business procedure according to enterprise rules.

Although IPM 287 is, in this case, a loan application process, such an IPM may be programmed to execute virtually any conceivable business process that an enterprise may offer as a wholly or partially automated service to clients. IPM 287, in this example, is presented as a series of rows and columns comprising entry fields and return fields in a GANT chart. For example, before the desired functionality is inserted into IPM 287, it is a generic COM model that is adaptable via programming for various business processes and resource interface as previously described. It will be apparent to those with skill in the art that a COM model and a GANT form are each simply exemplary of known devices that may be employed in practicing the invention The format of entry and return fields presented herein is not required to practice the present invention. The inventor merely deems this particular format to be friendly to a programmer building the model and analyzing the returns such as may be displayed on a computer screen. A tool kit aids a programmer with building and fine tuning an IPM such as IPM 287. Such a tool kit may be part of the programmers desk-top CINOS application such as perhaps tool kit 125 of FIG. 4, or may reside in and be accessible from a server hosting a CINOS Manager application such as server 77 of FIG. 1.

FIG. 14 is a GANT chart for a process executable by a CINOS operating system according to an embodiment of the present invention. This chart in this embodiment is an interactive input and display and editing interface wherein a programmer may program a business process having discrete steps and sub-steps. It will be apparent to the skilled artisan that such an interface is but one of a number of interfaces that would be suitable for the purposes of the invention, and is meant to illustrate features of the invention. Broadly speaking, by listing steps of a process in this chart along with parameters to be described more fully below, an application module is created which, by execution, performs the process step by step, and tracks completion of individual tasks, as well as providing reminders when and if allotted completion times are pending or exceeded, and so forth. It will be apparent to the skilled artisan that GANT processes may also be illustrated by flow diagrams (typically PERT charts), and, in a preferred embodiment, the chart depicted in FIG. 14 may be converted to an editable GANT flow chart as well. For Example, standard products like MSProject Planner may be used to generate a PERT or GANT chart, and by using certain labels both for steps and resources, the generated file may directly become an IPM Object.

Referring again to FIG. 14, a title row 289 comprises column headers and a link to a pop-up editing window that provides for entering steps and necessary parameters. The pop-up window in a preferred embodiment has input fields for entering task numbers, specific action for the task, sequence and pre-requisites related to other tasks, allotted time to complete, and notification parameters, as well as a Cancel and a Save function. Through the input window a programmer can design and relate all tasks and sub-steps needed for a process.

Because IPM 287 is a container for COM objects, task objects may also be loaded as required by the programmer in order to set up the main and sub-tasks inherent to the process as previously described such as by drag and drop method as is known in the art. For example, certain objects or modules to be inserted are for access to certain data from the IOM, while other objects are adapted for accessing certain other databases or resources, or for performing certain process-related functions.

A variety of notification/command modules may be inserted into IPM 287 according to possible results or states that may appear during process execution. The actual module that will be invoked will depend in part on the programmer, and in part on the process sequence. Some of the windows are return windows that return results during execution of the process. These are windows in the columns labeled time begin, time end, and actual time.

In this embodiment, as a programmer enters new steps and sub-steps in building a new application module, the step numbers with name and generic parameters appear as new rows. When the last step is entered and configured the GANT chart is complete, and the process is ready to invoke and execute.

A completed chart is editable in the sense that steps and sub-steps may be altered, added, deleted, and the like, along with names, allotted times, action parameters, and the like. A programmer may therefore select an existing application module and edit it to save as a new application module.

When a module is complete the application created may be stored and related to other tasks such that the application may be called whenever necessary to perform functions for the operating system. Such processing will typically be transparent to agents, clients, knowledge workers and the like, but on certain occasions, by need, a chart may be displayed while a process is running or for other diagnostic purpose.

In general, building modules (objects) contained in a programmers tool kit are generic to the basic processes being created by the enterprise including standard interface and command objects to other resources or CINOS systems. These building objects used to program IPM 287 may be provided by the provider of the CINOS system according to the general type of business and system architecture used by the enterprise. In one embodiment, an enterprise programmer may create the building objects according to desired enterprise functionality and custom CINOS architecture. Therefore, one CINOS system software package may be provided specifically for a loan company while another CINOS system software package may be provided for an investment firm and so on.

Referring now back to FIG. 14, as a programmer defines steps and sub-steps as tasks to be performed, he/she is setting up the main tasks and sub-tasks that the application will perform when executed. In this particular example, task 1 is a pre-qualification task for a loan as evidenced by the name Pre-Qual in window 291 in the Name column.

Task 1 comprises 3 sub-tasks, namely sub-task 1*a*, sub-task 1*b*, and sub-task 1*c*. Sub-task 1*a* comprises a module for obtaining data from a general credit field such as may be stored in a database and represented via metadata in the IOM described above. Hence, sub-task 1*a* would comprise the necessary modules or objects for interface with the IOM previously described above and for obtaining general credit data which may be an enterprise rating system code derived from actual credit reports. Additional related data may also be accessible in step 1*a* a such as a list of creditors, payment history, and so on. Step 1*b* provides access to data about credit to the enterprise, and step 1*c* provides access to data about income such as total monthly income, source of income, etc. In this way, main task 1 may be completed by executing the sub-tasks 1*a*–1*c*.

In building an IPM such as IPM 287, a goal is to provide an interfacing process application that may execute and perform an entire business process from start to end according to CINOS constraints, time constraints, and enterprise rules. Once completed, tested, and fine tuned, an IPM such as IPM 287 may be used as a functional model for the business process that it represents.

Column 293 represents a time that each step and sub-step begins executing within the CINOS system. Numerals illustrated in column 293 represent units of time expired as the process is executed. For example, Main task 1 named Pre-Qual begins at 0000 (the time that the application is invoked). A client who is requesting a loan via telephone or other media may invoke IPM 287 thus beginning it's automated execution while the client waits in queue. In some embodiments, wherein a client is not live in queue, an agent may initiate the process based on a not-live request such as an e-mail or fax. In general the time displayed in windows under TIME Begin are returns only, based on the actual times related and previously required steps are completed. That is, typically a task will not begin at a fixed time from 0000, but will begin as soon as pre-requisite tasks are all completed.

Windows in column 295 show the time that a step actually ends. This is typically a return window as well, and the time displayed will be the begin time plus the task elapsed time to completion. The programmer typically allots a time for each task, and the actual time may be more or less than the allotted time. Other actions may be invoked in the case that the actual time exceeds the allotted time.

All sub-steps under a main task typically are allotted time increments (according to completion goal) of the allotted time for the main task such that the their sum equals the time allotted for the main task. The purpose for allotting time segments for each task and sub-task is so that efficiency improvements may be pursued with regards to client waiting and system performance and that interfaces with other systems such as routing systems or the like are handled smoothly. The time allotments, as described are in effect, time goals set by the enterprise. Time modules (not shown) are COM tools inserted by the programmer.

Windows in column 297 represents return fields that return actual elapsed times associated with each task and sub-task. For example, Main task 1 (Pre-Qual) began at time 0000. Allotted time for main task 1 is 0010. Main task 1 was actually completed at time 0008 or 0002 ahead of schedule. As is the case with column 295 (Time End), times in which the associated sub-tasks are completed are increments whose sum equals the actual time for the main task to obtain completion.

Windows under column 299 contains notification fields under the name-field Notify, which is part of title row 289. If there are no problems in the execution of a task or sub-task then notification is given to go on to the next task or sub-task. However, if there are problems in execution such as operation time out, or insufficient data for return, then a suitable notification-command may be given to the system such as return to agent, repeat prior task or sub-task, and so on.

It is important to note here that according to enterprise rules, notification may include stopping the process and requesting human intervention, allowing more allotted time for a task or sub-task to complete and then repeating the task or sub-task, or any variety of other options.

In this example, IPM 287 comprises 4 main tasks of which main task 1 has already been described. Main task 2 is determination of loan type. IPM 287 may comprise tasks or sub-tasks that may be executed in parallel under certain circumstances. Such is the case with part of main task 2 or more specifically sub-task 2*a*. For example, choices and data regarding loan type, amounts of loan, purpose for loan, and the like may be held in a separate section or database such as product database or the like. Therefore the multi-taskable IPM 287 may begin main task 2 upon invocation at time 0000. However, because a sub-task 2*b* requires the same data obtained with regards to main task 1, it cannot begin until main task 1 is complete or at 0008 as indicated in column 293.

A sub-task 2*b*1 is depended from sub-task 2*b* and is a data sorting operation. An example would be the sorting of assets from liabilities. Sub-task 2*c* allows insertion of data on a selected interactive or multimedia loan application in an automated fashion. Hence, the first 2 Main tasks and their associated sub-tasks pre-qualifies a client and obtains and inserts required data into an interactive application. For the purpose of this example, there have been no errors or problems with the first 2 main tasks allowing all notifications to proceed with the process without human intervention.

IPM 287 includes a main task 3 for post qualification and data validation. Such a task may be required according to enterprise rules with a system recommendation to be returned regarding weather or not a particular client should qualify. It should be noted here that a small amount of time elapses between a main task and a first sub-task with regards to main tasks 1–3 this is meant by the inventor to show system preparation time to execute to first sub-tasks.

Under main task 3, a sub-task 3*a* validates income. For example, a client's income data, instead of being current, may be out of date according to a time constraint imposed by the enterprise for updating income data in a database. If this is the case, then a suitable notification may be made to the system. The process may be temporarily halted due to the notification while an IVR interacts with the client to provide more current data. After the client has provided the data, it is updated to the IOM and sub-task 3*a* may be repeated. In some embodiments, subsequent tasks or sub-tasks in a process may be executed while an IVR solicits more data from the client provided that they are not critically tied to the problem task or sub-task that could not be completed.

A sub-task 3*b* validates the applicant's source of income, perhaps by accessing a current database containing employment records provided by the client's employer. In one embodiment, an automated out-dialer may be used to contact the employer. When connection is made, the call may be transfer to an IVR or a live attendant so that validation may be completed. In some cases this will take more than the allotted time shown in this example because human intervention is utilized. In such cases where it is known or perceived that human intervention will be required, then more time will be allotted for the planned purpose. However, if the required data is supplied ahead of the loan application and stored for access by IPM 287, no human interface will be required.

Similarly, a sub-task 3*c* may prompt the client via IVR or live attendant for inclusion of any added income such as may not be indicated in data storage such as spousal income, an additional job-income source, and so on. Such IVR or live attendant interaction may be part of the loan procedure with appropriate time allotted to complete such procedures and not specifically the result of a problem or notification. Therefore, the amount of human intervention included in a business process such as represented by IM 287 may be dictated by enterprise rules.

A sub-task 3*d* calculates the debt to income ratio and other required calculations or manipulations of data and then makes a system recommendation, based on the calculation and enterprise rules, to the agent to which the client will be transferred for closing. Hence, the notify field for sub-task 3*d* is labeled present. Upon receiving the present notification, the system forwards the information (completed loan application) to an agent ahead of the client's call. An interface to the automated routing system enables IPM 287 to determine which agent will receive the client out of queue.

A main task 4 is simply to display, on an agent's graphical user interface (GUI) a completed copy of the loan application associated with the client's identification and incoming call. The notification field returns END at task 4 because it is the end of the procedure. At this time, a copy of IPM 287 with all of the fields complete may be sent to the programmer or system administrator as indicated on a top row comprising the label field (loan application), Time begin field (0000), Time End field (00305), Actual Time field (00255), and an update notification option labeled Update.

In this example, the actual time of 00255 for completing a loan application and routing it to an agent is 0005 ahead of the allotted time or goal time. The programmer may elect to update IPM 287 as the most efficient model yet created thereby using it again for subsequent applications, or he may elect to fine tune IPM 287 further based on the information provided in the returned model.

Each Interactive Process Module created is adapted to operate with a CISNOS operating system according to the present invention. As such, each completed module is callable by the OS when needed to perform its programmed function. Further, each module is provided with one or more inputs to be able to perform its function. In the example of qualifying a loan applicant as described above, the required inputs will be such as (a) potential borrower's identity, (b) type of loan desired, (c) amount of loan requested, and (d) payback period requested. Moreover, each module is adapted to interact with other CINOS modules. For example the loan qualification application described is adapted to access other modules, such as the IOM, using the potential borrower's ID as a key, to recall information, such as income information. Generally speaking, process modules will have, then, certain commonalties, such as at least one defining input, a task to be performed based on input, and a result to be returned, as well as a facility for returning the result. Such results may in some cases be Yes/No, a recommendation or the like, and may be either displayed for a recipient or used as a further input to another Interactive Process Module.

It will be apparent to one with skill in the art that one IPM may be employed for one business process containing various secondary alterations to the generic process without departing from the spirit and scope of the preset invention. For example, a mortgage loan may have differing tasks and sub-tasks than an auto loan and so on. However, because access to system repositories and resources are similar in most loan processes regardless of type or amount of loan, modules may be inserted that cover the options. Moreover, separate business processes may be run from one IPM as long as the required modules are present and operational.

It will further be apparent to one with skill in the art that the present invention may utilize a convention other than COM such as by Java applett or the like.

As previously described, IPM 287 is innovative in part because a generic application or model may be used for building several differing automated processes, and because it breaks down a process into tightly controlled tasks and sub-tasks that are executed in concert through interface with other CINOS systems. As a result, complicated business processes may be executed within CINOS much faster and more efficiently than with prior art systems. Furthermore, processes may in many instances be wholly automated and integrated with system routing and other intelligent services.

Diverse Interaction Model

In a preferred embodiment of the present invention, a multimedia communication center is provided, as part of CINOS, including an interface engine or model that allows communication-center interactions resulting from diverse interaction paths to be recorded and entered as threaded dialog in concert with threaded dialog from more conventional interactions such as are recorded and entered via multimedia threading as described above.

For the purpose of this specification, a diverse interaction path means a non-routine, or less-routine type of communication path that is typically more complicated than a conventional interaction path such as a multi-agent conference or in-place discussion regarding an enterprise client or issue generic to the client. Another example would be simultaneous communication between two or more agents with outside vendors to assist a client who is live and in queue. Yet another example would be a multi-client discussion group organized around a commonly shared issue or product. It is desired that such dialog or dialogs including associated media is made a part of an accessible contact history wherein the diverse interactions may take their place among the more conventional interactions making up a customer or issue-specific multimedia thread in a database or contact history.

CINOS manages traditional interactions according to a multimedia threading technique taught above wherein various methods, including the use of a live attendant, are used to record, parse and enter interaction data into the contact history. Such dialog is threaded and associated with actual recorded media through use of icons or links whereby, upon interacting with such links or icons, one may have access to actual stored media. However, as interaction paths become more diverse and complicated, as in the examples provided above, it becomes apparent that added functionality and innovation is needed to enable efficient organization and recording of such data into the contact history so that not only are primary dialogs and associated media simple to access, but also secondary dialogs and media resulting from more diverse interactions.

Interaction dialogs among second and perhaps third parties involved in a transaction, such as perhaps a contract negotiation, may occur simultaneously and, in many instances, without inclusion of the primary parties to the transaction or negotiation. Therefore, the prospect of logically including those dialogs among the primary dialogs on a client or issue identified thread is more complex. In one embodiment of the present invention, such functionality is provided via a unique event handler adapted to identify and organize such dialogs so that they may be associated along the proper thread or threads in a contact history.

Figure 15:
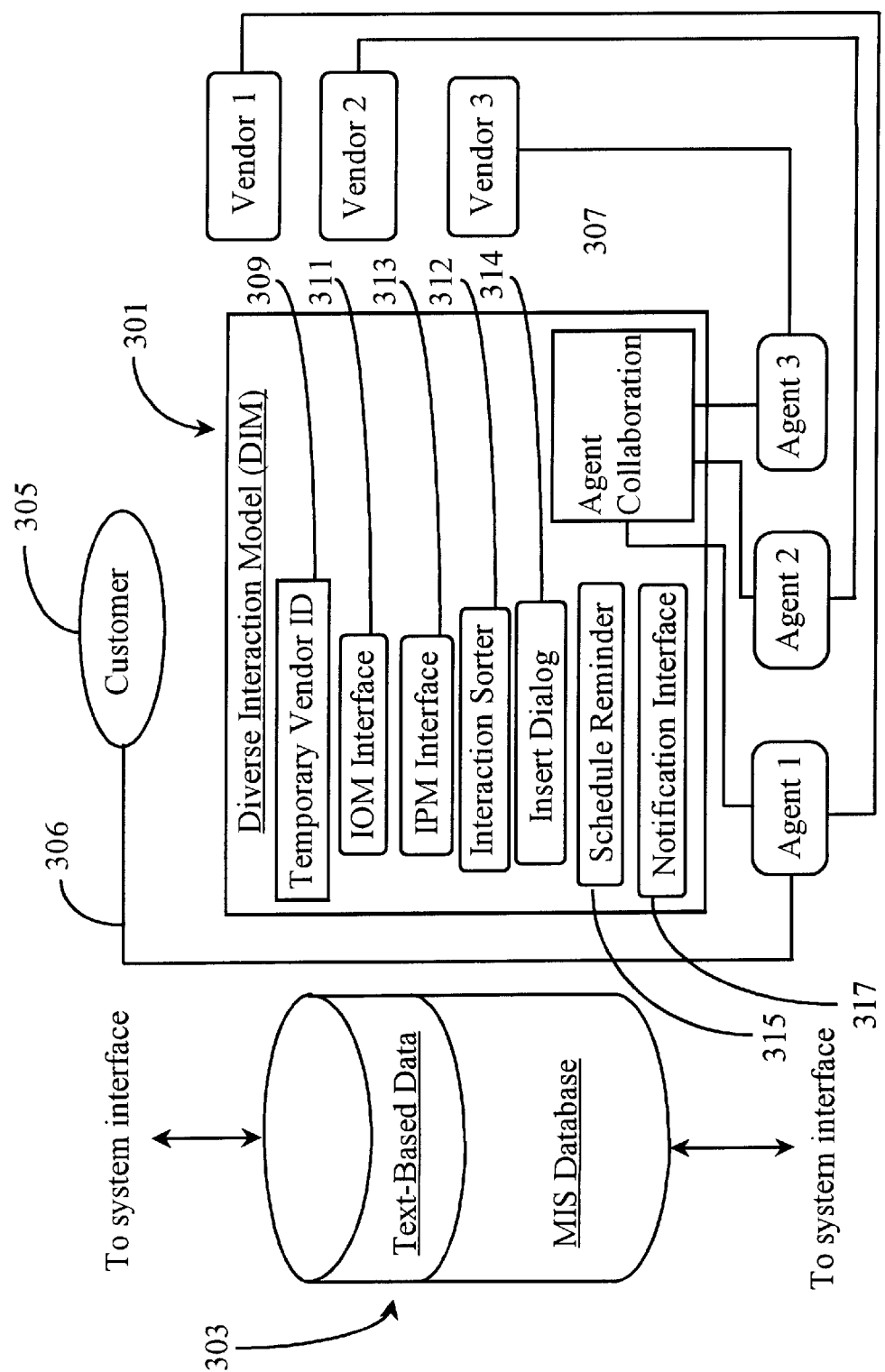
FIG. 15 is a block diagram illustrating functionality of a diverse interaction model according to an embodiment of the present invention.

FIG. 15 is a block diagram illustrating functionality of an exemplary diverse interaction model (DIM) according to the present invention, and it's relationship to other elements of an operating system such as the CINOS system described herein. In this particular example DIM 301 is provided as an open interface capable of asynchronous interfacing between live interactions and other CINOS interfacing engines such as the IOM and the IPM described above. In one implementation, as a COM model, DIM 301 is a programmable interface wherein functionality may be installed according to specific enterprise rules.

The example provided herein is meant to represent just one possible interaction set that may be tracked, recorded, and made a part of a contact history of a communication center utilizing CINOS. Diverse interactions, as previously described in the background section and described with examples above, may include virtually any conceivable interaction or group of simultaneous interactions that may comprise more than a simple one-on-one interaction whether incoming, out-going, or internal communication using any supported media.

Also, the exemplary DIM of FIG. 15 is shown with a number of functional code sets for accomplishing certain ends, such as assigning ID to transaction partners and the like. In FIG. 15 these functions are shown as within the boundaries of the DIM. This is not meant to limit the DIM model to having complete code sets as a part of each DIM. In reality, such code may be programmed as a part of a DIM in some instances, and in other instances the DIM is provided with ability to call and use existing code in CINOS. CINOS, as described elsewhere in this specification, has, for example, functional code for tracking commitments and reminding parties to commitments of approaching and expired time deadlines. DIM modules may be adapted to call this and other such operating code to accomplish purposes of the particular DIM. The location of functional code examples in FIG. 15 should therefore be taken only to represent the existence and use of the code, not whether or not the code is resident in the DIM.

Referring again to FIG. 15 for exemplary purposes, assume that a customer 305 who is a subscriber to CINOS is engaged in a purchasing process with a communication-center agent 1 as illustrated via indicated link 306. Perhaps customer 305 is negotiating to purchase a turn-key machine shop operation that is being put together as a package by the hosting enterprise. There are, in this example, two other agents involved in the process. These are agent 2 and agent 3 as illustrated. In order to provide a complete package to customer 305, the enterprise must enlist the cooperation of 3 outside vendors who will each provide key components of the package. These are vendor 1, vendor 2, and vendor 3. For the purpose of this example, it will be assumed that vendors 1–3 are not subscribers to CINOS and are not connected to CINOS, although in some embodiments, they may well be subscribers connected to a CINOS-driven system.

A data repository 303 is provided as part of the CINOS architecture and is adapted to store multimedia and text-based interactions as well as providing an accessible threaded history of communication-center dialogs. Repository 303 is analogous to repository 187 of FIG. 7. As such, it is logically divided into two sections, one for storing threaded dialog, and text-based media (Text-based Data), and one for storing recorded multimedia interactions (MIS Database) such as may have occurred with respect to enterprise activity.

As customer 305 converses with agent 1, the conversation is being recorded and entered into MIS database while a text version is being installed on a dialog thread assigned to the customer in the Text-based data section of repository 303, as described above. The recording and storing of this simple interaction is accomplished as described with respect to embodiments presented with reference to see FIG. 7 and the text describing FIG. 7 above. However, interactions between other involved agents and vendors are important to the enterprise in terms of selling the machine shop, and to the customer in terms of insuring that every angle is covered with respect to his planned purchase.

DIM 301 allows these additional diverse interactions to be recorded and included on the dialog thread belonging to customer 305 in repository 303. DIM 301 is adapted, in this embodiment, to assign CINOS identification code to each outside vendor such as vendors 1–3 as illustrated via a function module 309 labeled as Temporary Vendor ID. This identification may be accomplished in a variety of ways such as perhaps attaching a unique code to a vendor's parameters which may include phone numbers e-mail addresses, IP addresses, company titles, etc. The identification may be temporary, such as for a time period covering a series of planned interactions, or permanent depending on enterprise rules. In this way, CINOS may track and identify all communications to or from vendors 1–3. Because agents 1–3 and customer 305 are subscribed to CINOS, they have permanent identification as do all their enterprise interactions.

Part of DIM 301 allows for in-place agent collaboration or discussion via function module 307 titled Agent Collaboration. Function module 307 may be an existing multimedia chat program that may be based in a variety of media such as audio, video/audio, or text. Agents 1–3 are illustrated herein as engaged in collective collaboration via module 307. An on-screen computer discussion would be a likely venue for such collaboration.

Agents 1–3 in this embodiment are illustrated as being engaged in conversations with vendors 1–3 respectively as illustrated via links connecting the agents and the vendors. For example, agent 1 may be conversing with customer 305 via COST phone, while engaged with vendor 1 via DNT phone such that the DNT conversation is not audible to customer 305. This may be accomplished via methods known in the art such as a progressive hold button or switching device. Agents 2 and 3 are similarly engaged with vendors 2 and 3 respectively. In this case, agents 1–3 are soliciting assurances that vendors 1–3 will have no problems with availability and delivery of their respective parts of the turnkey package. Perhaps exact parameters are being worked out as well such as just-in-time delivery date assurances and so on.

As agents 1–3 obtain required information from vendors 1–3, they are collaborating and sharing the information via in place discussion through interactive function module 307. As the agents finish collaborating, agent 1 may relay such information as may be desired to customer 305 via COST connection and perhaps acquire a purchase order for the machine shop. Hence, a complicated series of interactions with multiple parties has transpired in a comparatively short period of time in order to aid customer 305 in making a decisive purchase without ongoing and periodic communication being necessary over a much longer time. It should be noted here however, that multiple simultaneous interaction as illustrated in the example is not required to invoke the aid of DIM 301, or to practice the present invention. The inventor intends only to show that invoking DIM 301 to aid in organizing and threading dialog from the above described diverse interaction may be beneficial in this instance. The exact parameters and functionality of DIM 301 will of course depend on enterprise rules.

Coordinating and threading dialog from the multi-party interaction is performed, in this embodiment, via DIM 301 as was previously described and will be further detailed below. Supplied interface modules within DIM 301 provide command capability to other CINOS routines. One of these modules is an IOM interface 311 that may obtain data from the IOM regarding customer 305, vendors 1–3, or other related data, and relay such data to agents involved in the above described transaction such as agents 1–3. Similarly, an IPM interface 313 may obtain data such as may be processed in conjunction with any automated process that customer 305 is engaged in and mirror such data to agents 1–3 as may be required. An example would be perhaps mirroring data processed by an IPM handling the customer's overseas shipping information or the like.

Because each participant to the dialog is identified, and all of the interactions are identified, they may be time-stamped and organized according to such identification or identifications by an interaction sorter module 312. Agent 1 and customer 305 may, in some embodiments, maintain priority on the thread in which the turnkey purchase dialog is a part. However, because the threaded dialog supports multimedia, and may accept additional information, secondary dialog resulting from agents during collaboration and agents to respective vendors may be inserted onto the customer's thread according to any enterprise rule. Interaction sorter 312 may organize the secondary interactions according to identification parameters, add a time stamp, and sort according to chronological order. If simultaneous interactions are taking place such as was the case in this example, then they may be sorted by involved agent ID and threaded sequentially as dialog groups such as all interactions of agent 1, followed by all interactions of agent 2, followed by all interactions of agent 3, followed by all agent collaboration dialog.

The dialogs may be logically inserted on the thread of customer 305 via a dialog insert module 314 which is a command interface to various data entry systems such as may be associated with speech to text converters, automated fax systems, e-mail systems or the like. Module 314 may also provide entry paths to live attendants for latter entry after transcription of video or the like.

Insert dialogue module 314 may, in some embodiments, provide for secondary dialog to be entered on hidden threads marked by interactive icons or markers inserted and adapted to reveal the hidden dialog when selected, such as with a pointer device. In this way, primary agent-customer dialog may be viewed separately from intermediate agent-to-agent collaborative dialog, dialogue with third parties, and so on. Interactive icons may also accompany such dialog for the purpose of calling up primary recorded dialogue. In this way a system auditor or other worker may review an involved transaction to insure that nothing was missed or overlooked by various parties to the transaction. Also an accurate record may later be printed out if required to settle a future dispute or unresolved issue related to the transaction.

As an open interface, DIM 301 may be adapted to handle multiple unrelated interactions as they may occur within a multimedia communication center. In another embodiment, separate DIM's may handle separate diverse interactions. Similarly, there are many possibilities regarding the location of a DIM within CINOS architecture. For example, DIM 301 may be part of a CINOS manager application such as described with reference to server 77 of FIG. 1 (P3313PA). Moreover, DIM 301 may be adapted to handle only diverse interactions as defined by enterprise rules, or may in fact handle all communication center interactions.

A schedule and reminder module 315 is adapted to notify CINOS when an identified party to a transaction must fulfill a promise or scheduled task associated with a transaction or negotiation. A universal CINOS data and time function tracks all recorded interactions and ages them accordingly much like a computer operating-system time and date function. If a specific interaction involving a scheduled promise approaches deadline, then notification arrangements to the responsible party may be made ahead of time. A notification interface module 317 alerts an automated message system which may be part of repository 303, or held separately on the network, to send notification of the commitment to involved parties.

The DIM described above is illustrated according to a particular diverse interaction situation involving a customer and multiple agents and vendors. A multitude of differing interaction paths may, however, be supported and enhanced. For example, a DIM may be programmed in a manner that customers purchasing particular product may be automatically logged into a discussion group existing for the purpose of interactive technical support among customers. In this example, the discussion group can be a WEB-based chatroom, a video-conferencing facility, or may support any other medium supported by the CIOS system. In addition to allowing the customers to interact through the MMCC, many enhancements may be provided specifically to such a group, such as database access to technical information and the like pertinent to the particular product As another example, outside businesses, such as vendors and the like, identified in the CINOS system may interact with one another for defined purposes through a customized DIM in CINOS. In this case, vendors 1 and 2 in FIG. 15 may have an interdependency in supplying parts or services for a CINOS-managed process or project. A DIM may be set up quickly and easily allowing the two vendors to cooperate and to access certain information in the enterprise data repositories related to the defined purpose of the DIM and the project.

It will be apparent to one with skill in the art that a DIM such as DIM 301 may comprise additional or fewer modules, or modules of a differing function than the ones illustrated herein without departing from the spirit and scope of the present invention. For example, additional interface modules may be added and adapted to interface with other CINOS routines such as routing functions or other automated services. It will also be apparent to the skilled artisan that vendors supplying the enterprise with products destined for customers may or may not be utilizing CINOS systems without departing from the spirit and scope of the present invention. For example, vendors 1–3, in this example, may receive automated and scheduled notification for just-in-time delivery or the like via notification interface 317 if it is operationally interfaced with a CINOS out-bound out-dialer application.

It should also be apparent to one with skill in the art that CINOS interpretation of a diverse interaction as opposed to a conventional interaction may be programmed according to enterprise rules without departing from the spirit and scope of the present invention. For example, a one-on-one interaction of any media type may be considered by an enterprise to be a conventional interaction with the dialog entered as such while the addition of multiparty side discussions may be considered a diverse interaction associated with the conventional interaction thus invoking a DIM such as DIM 301, and so on.

Invocation or initiation of a DIM such as DIM 301 may occur at the planned beginning of such interactions, or at such time that a conventional interaction may become a diverse interaction with the addition of, perhaps more than one party to the interaction. In one embodiment, a transaction monitor or monitors such as are known in the art may be used to identify the number of parties in an interaction, or perhaps the type of interaction based on enterprise rules, and be adapted to notify a DIM such as DIM 301.

In one embodiment, CINOS may be shared by distinctly separate organizations who must collaborate and provide infrastructure in order to complete a vast project or mission such as perhaps building and launching a space station. Many specialized groups involved in such a process may hold diverse interactions comprising multiparty discussions, interactive seminars, cost accounting meetings, or other like collaboration without physically gathering to hold such meetings. Such implementations may be largely temporary and customized according to requirement. A DIM in this case would be responsible for identifying and providing instruction for entering and threading such dialog resulting from the multiparty interactions into a central repository shared by all participating organizations.

Specialized Threaded-Dialog Model

According to a preferred embodiment of the present invention a unique programmable event handler is provided, termed a specialized threading model (STM) by the inventor. In addition to logically inserting dialog from diverse interaction paths to associated customer threads and the like as described with reference to the section entitled Diverse Interaction Model, it is also desirable to create special threads (associations) derived from stored and real-time data records, which may be used for temporary or ongoing research. Therefore, an STM is provided as a programmable-interface application which allows a researcher to find and study information shared within and through CINOS according to very specialized criteria.

The term Model as presented herein and associated with other COM-based interface engines or applications such as the above described IOM, DIM, and IPM, is used to describe COM-based software models wherein functional software modules and/or objects may be installed in order to create the larger functional software module which is called in the art a COM model. It will be apparent to the skilled artisan that functional modules, as will be illustrated as located within an STM as taught below, are not limited to residing within the described model, but in many instances, may be existing code-sets or routines generic to CINOS and resident in other parts of interfacing software. These code-sets or routines may be initiated or invoked by a module from within the described model as will be further explained below. It will also be apparent that the COM-object implementation is exemplary, and other programming techniques may be used within the spirit and scope of the invention.

Figure 16:
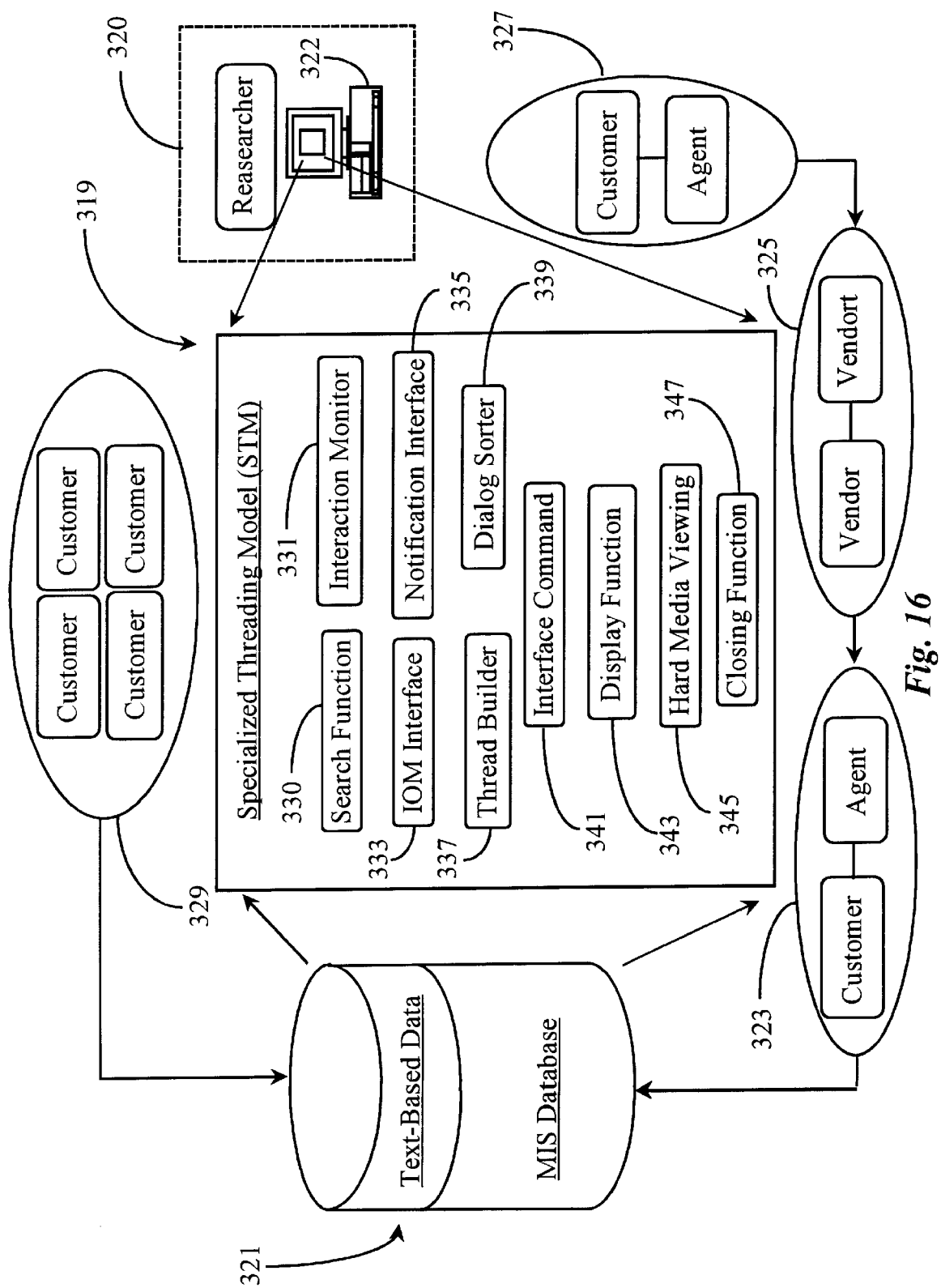
FIG. 16 is a block diagram illustrating functionality of an exemplary specialized threading model according to an embodiment of the present invention.

FIG. 16 is a block diagram illustrating an exemplary Specialized Threading Model 319 according to an embodiment of the present invention. Model (STM) 319 is provided as a programmable tool (software application) operable in CINOS that may be invoked and used by a researcher or other authority for the purpose of conducting specialized research by associating stored and real-time data. A researcher 320 may execute a programmed STM from a PC/VDU such as PC/VDU 322, as illustrated via expansion arrows emanating from PC 322.

A communication-center data-repository 321 is provided for the purpose of warehousing data and is analogous to previously-described repositories such as repository 303 of FIG. 15. Repository 321 is logically divided in many preferred embodiments into two sections for data storage. One section (Text-Based Data) contains all of the communication center's threaded-interaction dialog and text media. The other section (MIS Database) contains all of the recorded multimedia associated with the dialog stored in the text-based section. It will be apparent to one with skill in the art that there may be additional repositories or databases held in separate locations on the CINOS network without departing from the spirit and scope of the present invention. The inventor chooses to illustrate only one such repository for the purpose of simplifying explanation. Also indices to or abstracts of such databases may be used, rather than databases themselves.

STM 319 may access stored text data from repository 321 (Text-Based Data section), stored multimedia data from repository 321 (MIS Database) and, in some cases, live text or multimedia data such as may be occurring during live interaction in a multimedia call center. Such live interactions as described and illustrated in this embodiment include interaction 329 which is a chat room having four customers engaged in interactive communication, for example, in dialog concerning a mutually purchased product (internal-hosted by the enterprise). An interaction 323 is illustrated and involves a customer and an agent wherein, for example, the customer has initiated the interaction (incoming). An interaction 325 is illustrated and involves two outside vendors wherein, for example, the vendors are subscribed to CINOS and discussing details of a joint just-in-time (JIT) shipment to the enterprise (external). An interaction 327 is illustrated and involves an agent and a customer (labeled as such) wherein, for example, the agent has initiated the interaction (out bound).

Hereinafter, the live interactions illustrated will be identified by the interaction type and the element number. For example, interaction 329 will be referred to as internal interaction 329. Interactions 323, 325, and 327 will be referred to as incoming interaction 323, external interaction 325, and out-bound interaction 327 respectively. The interactions described above are all live and occurring during the run-time of STM 319. All live interactions illustrated herein are entered into repository 321 as illustrated via directional arrows emanating from each interaction in a direction toward repository 321. These stored interactions as the real-time interactions are terminated become part of the stored database along with all previously stored interactions and annotated and text versions of such interactions.

As previously described, STM 319 may, through a monitoring process described in more detail below, access live data (dialog) and utilize such data at the time the data is created, or more specifically, before or at the same time that such data is either entered into (text) or recorded into (multimedia) repository 321. In this way, a unique and innovative method is created whereby dialog associations may be created from stored data with additional dialogs being added to the association in real-time as they occur with respect to live interactions such as those illustrated in this example. Such a process may be executed via STM 319 and run in the background on a PC/VDU such as PC/VDU 322 being used by researcher 320 while other work is being performed. Similarly, STM 319 may reside in repository 321 instead of PC/VDU 322 when not in use as illustrated via expansion arrows emanating from repository 321. That is, the functionality may be client-server based. In this case, a CINOS-connected agent may invoke STM 319 remotely via PC such as PC/VDU 322.

Referring back to FIG. 16, STM 319 is different from the diverse interaction model (DIM) 301 as described with reference to FIG. 15 in that it is expressly dedicated to creating new associations or dialog threads from those already created (and from live interaction) based on implicit instruction from a programmer which may be a knowledge worker, agent, researcher, or any other authorized individual. Such associations may be stored in repository 321 and displayed on a PC/VDU such as PC/VDU 322.

STM 319 may be created in a generic COM container that is provided along with insertable modules in the form of a desk-top or server-based tool-kit accessible to researcher 320. Once created, an STM such as STM 319 may be modified through editing for the purpose of performing another task which may differ from the original task. Several STM's such as STM 319 may be created for different research projects and be run simultaneously within CINOS and share the same data and interfaces in an asynchronous multi-tasking environment such as is attributed to CINOS routines.

In the example provided herein, STM 319 comprises insertable modules that are dedicated to performing certain functions or interfacing with and invoking certain physically separated functions or routines that are generic to CINOS. For example, a search function module 330 is provided and adapted to searching stored data for pre-defined key-words or phrases similar to the operation of known search functions or search-engines used on the Internet or by other data functions. Again, this function may be wholly within Model 319 in some embodiments, and Model 319 may call the search function from CINOS in other embodiments.

Search function 330 accepts input parameters entered by researcher 320 such as a word, word association, phrase, Model number, and the like designed to associate otherwise unrelated dialogs. Additional input parameters that may be entered to search function 330 include limits or constraints associated with the type of and area of data to be searched. For example, if a desired keyword association-parameter is "disk-drive, problem, install", and the search area-parameter is customer history database, then search function 330 will look for all dialogs containing the words disk-drive, problem, and install that are stored in the customer history database.

Because threaded dialogs that may be stored in a multi-media communications center operating CINOS have markers or icons associating those dialogs to the actual stored media as previously described under the section entitled Rules-Based Storage and Threading of Multimedia Interactions, search function 330 may be uniquely adapted to identifying these media icons and associating them with the specific dialogs for latter interaction.

An interaction monitor module 331 is adapted to communicate with and send commands to various transaction monitors (not shown) that may be installed and operating within the CINOS operating system and adapted for monitoring live or recent interactions or transactions of various media types. For example, one transaction monitor may be assigned to monitor incoming COST calls, while another transaction monitor may be assigned to monitoring DNT interactions such as IP phone calls. Monitors may also be adapted to monitoring voice mails and other types of recorded voice messages. Furthermore, text-based monitors or text analyzers may be adapted to read and parse text-based messages such as e-mails, faxes, internal memos, or any other text documents that may be made into digital files. In this way, interaction monitor module 331 may utilize the same input parameters assigned to search function module 330 thereby extending it's functionality via command to such monitors and text analyzers assigned to live interactions as well as recent not-live text transactions that have yet to be entered into a repository such as repository 321.

To illustrate one example of the method described above, suppose that researcher 320 has programmed one key phrase "having a problem with" into search function 330 and programs interaction monitor module 331 to interface the parameters via command to a monitor charged with monitoring incoming COST calls. Upon initiation of STM 319, function 330 will search stored data for the key phrase while module 331 will instruct the incoming COST monitor to alert the researcher if the key phrase is detected during a live COST interaction. The scope of live interaction and recent transaction monitoring with regards to parameters set by researcher 320 may vary according to the purpose of STM 319. The advantage of the above stated ability will be more apparent through further description provided below.

An IOM interface module 333 gives researcher 320 an option to access an abstraction of hard data or metadata instead of accessing actual hard data from repository 321 as discussed with reference to the section entitled Stored-Media Interface Engine (Interaction Object Model). A notification interface module 335 provides notification in the form of an audible alert, pop-up window, or even an electronic page or other form of alert associated with events that may occur during execution of STM 319 that may be of express interest to researcher 320. Such an alert or notification may occur if, for example, a period for running STM 319 is nearing expiration, or perhaps if a required monitor for live interaction is not on-line. Notification interface 335 may simply notify when a new dialog is added to an association of dialogs, and so on. Module 335 may also be programmed to alert multiple parties or a single party of the occurrence of any notable events that may take place during the execution of STM 319.

A thread builder module 337 is an engine that creates a new thread or threads according to the parameters entered with respect to modules 330 and 331. For example, dialogs found by module 330, that contain the input parameter key-word, word association, or phrase are arranged and associated in a way that is logical to researcher 320 and in accordance with entered input criteria. A dialog sorter module 339 is provided to assist module 337 in this function, although in some embodiments, one module may be created for both functions. Dialog sorter module 339 may accept certain parameters for the purpose of organizing many separate unrelated dialogs according to programmed rules. That is, in addition to being associated by the search parameter, dialogs may be further organized by other input criteria.

In one embodiment, dialog sorter module 339 recognizes the time and date stamp for each dialog and organizes the dialogs adhering to that order. Thread builder 337 then creates an abstract thread or tree-structure associating the dialogs using interactive media icons and stores the new thread (association) in an unused section of repository 321 where it may be later accessed. In another embodiment, researcher 320 may enter overriding input parameters related to dialog sorter 339 that may negate or override existing time and date stamps for a more preferable sorting criteria such as a sort by media association, sort according to original thread identification, and so on.

An interface command module 341 may be installed for the purpose of accomplishing an interface to other CINOS systems such as routing, messaging, out-dialing, automated services, and so on. A display function module 343 allows an interactive picture of the newly created thread, as organized and built via modules 339 and 337, to be displayed on a PC/VDU such as the researcher's PC 322. The display may, in one embodiment, appear as an actual tree or thread connecting various interactive icons representing dialog and associated hard media. In another embodiment, the display may be a simple list of interactive text titles. The nature of interaction with the display is such that manipulating the interactive icons with a pointer device, or by entering certain keyboard commands, full text and hard media may be accessed and viewed by researcher 320 from PC 322.

A hard-media viewing module 345 comprises the necessary viewers for accessing and displaying various media types that may be represented by dialogs and supported within the communication center. Module 345 may, instead of containing actual viewers, simply contain command modules that invoke appropriate viewers installed on PC 322 or otherwise accessible by the PC. Such automated execution modules as module 345 enable the appropriate media viewer to be invoked without requiring manual initiation via PC 322.

A closing function module terminates execution of STM 319 according to parameters entered by researcher 320. An example of a closing parameter might be to terminate after a given period of time such as one work period. Other parameters may be entered as well such as terminate when a goal number of target dialogs is reached and constructed on a thread, and so on. Along with termination of STM 319, created threads or associations may also be terminated or not depending on input parameters. For example, time may be desired after a specialized thread is created for study purposes after STM 319 has terminated it's operation. In this case, perhaps a certain time period allotted for study will elapse before the thread is erased or purged from repository 321. In some cases, the specialized thread may be permanently stored for review.

It should be apparent to one with skill in the art that the modules represented with respect to STM 319 are only exemplary of the types of modules that may be used in creating STM 319. There may be more or fewer modules of different function and order without departing from the spirit and scope of the present invention. Moreover, such modules may be executable routines within STM 319, or simply command modules that notify and execute physically separate routines such as call monitoring routines or the like. In most embodiments a combination of resident modules and command modules may be used.

The advantages of STM 319 are that specialized research or study may be conducted by an agent, knowledge worker, or researcher for practically any type of issue or problem relating to enterprise activity. For example, an STM such as STM 319 may be used to obtain information related to the success or failure of newly introduced products, perhaps pointing to or indicating changes or revisions that may be desired by customers owning the products. STM 319 may be used to gage success of a temporary promotion or advertisement by creating a specialized thread containing dialogs of all interactions about the promotion or advertisement taking place since such time that the promotion or advertisement was launched.

The unique capability of STM 319 to access or intercept live interactions allows agents or researchers to monitor most recent dialogs associated with a subject of research. This innovative technique is especially useful in a fast-paced sales organization wherein many different products are sold over a network. A researcher may chose one product as a subject for an STM such as STM 319. By running the application in the background, he/she may actively obtain all incoming dialogs related to purchasing that product with such dialogs appearing on a specialized thread in order of occurrence. By programming interaction monitor module 331 with desired parameters, he/she may choose the type or types of supported media from which to select or search dialogs from.

Live interaction may be searched or parsed according to search parameters regardless of interaction type and media. For example, internal interaction 329, which in this embodiment is an open chat room, may be parsed for any dialogs relating to the search subject entered as a parameter to search function 330. Incoming, out bound, and external communications in any supported media may be monitored and parsed for search parameters. External communication such as vendor to vendor as illustrated via external interaction 325 may be monitored by CINOS in the event that they are connected to the CINOS network, which in this case may be a network operating system shared by a group of separate organizations.

In the case of transcription of a media type as may be performed by a live attendant, STM 319 may notify the attendant which may, for example, send the newly created transcript to a text analyzer being commanded via STM 319. The transcript dialog may then be parsed and associated accordingly.

It will be apparent to one with skill in the art that an STM such as STM 319 may be created to perform a wide variety of research tasks without departing from the spirit and scope of the present invention. For example, an STM may be created to associate dialogs related to a fix to a technical problem as may be discussed among customers, agents, technicians, or the like in chat rooms, via COST interactions, DNT interactions or any other supported media.

In one embodiment, an STM such as STM 319 may be used as a motivational tool for sales agents or the like. For example, by searching dialogs from agent/customer interactions for certain scripted phrases designed by the enterprise for improving customer relations or perhaps triggering a sale, one may determine how often or to what extent these phrases are actually being used by which agents and so on. By comparing such accounts to the agents personal sales records, one may obtain an indication of which phrases are more successful and so on.

Specialized threads created by STM 319 may aid the enterprise in such areas as improving service, increasing sales, streamlining operations, improving customer service, planning future manufacturing, or any other conceivable enterprise endeavor.

It will be apparent to one with skill in the art that one STM such as STM 319 may be programmed to search according to any constraints with respect to media type, area of search, length of time allotted for ongoing dialog association, and so on, without departing from the spirit and scope of the present invention. For example, one STM may search repository 321 and only incoming e-mails and faxes, whereas another STM may be dedicated to obtaining dialog from incoming live interaction but not dialog history as may be stored in repository 321 and so on. Also, rather than just basic searches encompassing keywords etc., natural language or at their emergence, multimedia search engines may be used, that compare a concept to recorded voice, video etc. There are many variant possibilities, many of which will depend upon the type of enterprise and supported media.

It will be apparent to one with skill in the art that CINOS may be implemented in a single communication center, or in a plurality of communication centers linked via WAN without departing from the spirit and scope of the present invention.

It will also be apparent to one with skill in the art that rules may be created which govern access to CINOS without departing from the spirit and scope of the present invention. For example, customers may be required to subscribe to CINOS, and may also be provided with a customer application enabling such access. In another embodiment, access may be given to the general public according to established security rules governing commerce, financial transactions, and other processes.

There are many existing and future implementation opportunities for an interaction operating system such as CINOS many of which have already been stated. The spirit and scope of the present invention is limited only by the claim that follow.

What is claimed is:

1. In a multimedia call center (MMCC) supporting multiple channels and forms of communication and storing call center transactions in a data repository, a threading software application, comprising:

a programming input for a user to enter association criteria;

an access function that accesses at least stored data in the data repository;

a search function that searches accessed data for association criteria, and notes those data entities that meet the association criteria; and a display function that displays at least indicators of data entities meeting the association criteria.

2. The application of claim 1 wherein the display function displays icons for data entities, the icons arranged in threads or tree structures.

3. The application of claim 2 wherein the icons are interactive icons that, being selected, invoke and render the data associated with the icon.

4. The application of claim 1 wherein the association criteria comprises individual and combinations of key words, phrases, text strings, date of occurrence, time of occurrence, media type, participant characteristics, duration of interaction, and participant initiation.

5. The application of claim 1 wherein the access function allows access to stored data and also an ability to monitor transactions occurring in real time.

6. The application of claim 5 wherein the real time transactions comprise connection-oriented switched telephony (COST) calls, data network telephony (DNT) calls, including Internet Protocol (IP) calls, facsimiles, e-mails, voice mails, and WEB document interactions.

7. The application of claim 1 further comprising a programmable alert function that alerts one or more of persons associated with the MMCC according to programmed alert criteria.

8. In a multimedia call center (MMCC) supporting multiple channels and forms of communication and storing call center transactions in a data repository, a method for conducting data research, comprising steps of:

(a) determining association criteria for relating data entities according to a research need;

(b) accessing the data repository to search stored data for conformance to the determined association criteria;

(c) searching the accessed data entities for match to the association criteria; and (d) displaying indicators of data entities that match the association criteria.

9. The method of claim 8 wherein in step (d) the display function displays icons for data entities, the icons arranged in threads or tree structures.

10. The method of claim 9 wherein in step (d) the icons displayed are interactive icons that, being selected, invoke and render the data associated with the icon.

11. The method of claim 8 wherein in step (a) the association criteria comprises individual and combinations of key words, phrases, text strings, date of occurrence, time of occurrence, media type, participant characteristics, duration of interaction, and participant initiation.

12. The method of claim 8 wherein in step (b) the access function allows access to stored data and also an ability to monitor transactions occurring in real time.

13. The method of claim 12 wherein in step (b) the real time transactions comprise connection-oriented switched telephony (COST) calls, data network telephony (DNT) calls, including Internet Protocol (IP) calls, facsimiles, e-mails, voice mails, and WEB document interactions.

14. The method of claim 8 further comprising a step for alerting one or more of persons associated with the MMCC according to programmed alert criteria.

* * * * *